US007566074B2

(12) United States Patent
Hawthorn et al.

(10) Patent No.: US 7,566,074 B2
(45) Date of Patent: Jul. 28, 2009

(54) APPARATUS AND METHOD FOR CONTROLLING AN INFLATABLE CUSHION

(75) Inventors: Laura A. Hawthorn, Tipp City, OH (US); Mark T. Winters, Troy, OH (US); Jason W. Brown, Miamisburg, OH (US); Ryan T. Pinsenschaum, Dayton, OH (US); James L. Webber, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 491 days.

(21) Appl. No.: 10/905,959

(22) Filed: Jan. 27, 2005

(65) Prior Publication Data
US 2005/0104347 A1 May 19, 2005

Related U.S. Application Data

(63) Continuation-in-part of application No. 10/078,961, filed on Feb. 20, 2002, now Pat. No. 6,991,258.

(60) Provisional application No. 60/541,793, filed on Feb. 4, 2004.

(51) Int. Cl.
*B60R 21/28* (2006.01)
(52) U.S. Cl. .................................... 280/742; 280/743.2
(58) Field of Classification Search ............. 280/743.1, 280/739, 740, 743.2, 742
See application file for complete search history.

(56) References Cited

U.S. PATENT DOCUMENTS

| 5,246,250 A | 9/1993 | Wolanin et al. | |
|---|---|---|---|
| 5,405,166 A | 4/1995 | Rogerson | |
| 5,489,119 A | 2/1996 | Prescaro et al. | 280/743.2 |
| 5,746,447 A | 5/1998 | Dyer et al. | 280/743.2 |
| 5,762,367 A | 6/1998 | Wolanin | 280/736 |
| 5,799,974 A | 9/1998 | Honda | 280/739 |
| 5,887,894 A | 3/1999 | Castagner et al. | 280/743.2 |
| 5,957,490 A | 9/1999 | Sinnhuber | 280/735 |
| 6,039,346 A | 3/2000 | Ryan et al. | |
| 6,170,871 B1 | 1/2001 | Goestenkors et al. | 280/743.1 |
| 6,186,540 B1 | 2/2001 | Edgren | 280/735 |

(Continued)

FOREIGN PATENT DOCUMENTS

DE 3618060 A1 12/1987

(Continued)

*Primary Examiner*—Faye M. Fleming
(74) *Attorney, Agent, or Firm*—Douglas D. Fekete

(57) ABSTRACT

An air bag module, comprising: a housing having at least one vent opening; an inflatable cushion being stored in an un-deployed position in the housing; an inflator for inflating the inflatable cushion, the inflator being in fluid communication with the inflatable cushion and having a plurality of inflation openings for allowing an inflation gas to pass therethrough, at least one of the plurality of inflation openings being in fluid communication with the at least one vent opening; a deployable member being secured to an interior surface of the inflatable cushion at one end and a portion of the airbag module at the other end; wherein the deployable member is configured to allow venting through the at least one vent opening when the inflatable cushion is in the un-deployed position and the at least one vent opening is covered by the deployable member when the inflatable cushion inflates towards a fully deployed position.

31 Claims, 19 Drawing Sheets

U.S. PATENT DOCUMENTS

| | | |
|---|---|---|
| 6,203,061 B1 | 3/2001 | Niederman et al. ......... 280/736 |
| 6,213,502 B1 | 4/2001 | Ryan et al. .................. 280/735 |
| 6,247,726 B1 | 6/2001 | Ryan ........................... 280/739 |
| 6,250,677 B1 | 6/2001 | Fujimura ................. 280/743.2 |
| 6,286,859 B2 | 9/2001 | Derrick et al. ........... 280/728.2 |
| 6,308,983 B1 | 10/2001 | Sinnhuber ................... 280/735 |
| 6,334,627 B1 | 1/2002 | Heym et al. .............. 280/743.2 |
| 6,371,517 B1 | 4/2002 | Webber et al. .............. 280/736 |
| 6,390,501 B1 | 5/2002 | Greib et al. .............. 280/743.2 |
| 6,409,209 B2 | 6/2002 | Amamori et al. ......... 280/728.2 |
| 6,409,213 B2 | 6/2002 | Webber et al. .............. 280/739 |
| 6,419,267 B1 | 7/2002 | Hashimoto et al. ....... 280/743.1 |
| 6,422,597 B1 | 7/2002 | Pinsenschaum et al. ..... 280/735 |
| 6,425,603 B1 | 7/2002 | Eschbach .................. 280/743.2 |
| 6,431,583 B1 | 8/2002 | Schneider ................ 280/728.2 |
| 6,431,596 B1 | 8/2002 | Ryan et al. .................. 280/739 |
| 6,439,603 B2 | 8/2002 | Damman et al. ............ 280/736 |
| 6,454,300 B1 | 9/2002 | Dunkle et al. ............... 280/742 |
| 6,499,765 B2 | 12/2002 | Hawthorn et al. ......... 280/743.1 |
| 6,511,094 B2 | 1/2003 | Thomas et al. ........... 280/743.2 |
| 6,561,545 B2 | 5/2003 | Greib et al. ............... 280/743.2 |
| 6,592,146 B2 | 7/2003 | Pinsenschaum et al. .. 280/743.2 |
| 6,616,184 B2 | 9/2003 | Fischer .................... 280/743.2 |
| 6,634,671 B2 | 10/2003 | Heigl et al. .............. 280/743.2 |
| 2002/0158456 A1 | 10/2002 | Fischer .................... 280/743.2 |
| 2003/0155756 A1 | 8/2003 | Hawthorn et al. ........... 280/739 |
| 2004/0012179 A1 | 1/2004 | Pinsenschaum et al. ..... 280/739 |
| 2004/0012180 A1 | 1/2004 | Hawthorn et al. ........... 280/739 |
| 2004/0051285 A1 | 3/2004 | Fischer ....................... 280/739 |
| 2004/0094941 A1 | 5/2004 | Waid et al. .................. 280/736 |
| 2004/0232677 A1 | 11/2004 | Fischer et al. ............... 280/739 |

FOREIGN PATENT DOCUMENTS

| | | |
|---|---|---|
| DE | 19912369 A1 | 10/2000 |
| EP | 1112902 A2 | 7/2001 |
| EP | 1112902 A3 | 7/2001 |
| GB | 2338214 A | 12/1999 |

APPARATUS AND METHOD FOR CONTROLLING AN INFLATABLE CUSHION

CROSS REFERENCE TO RELATED APPLICATIONS

The application claims the benefit of U.S. Provisional application, Ser. No. 60/541,793, filed Feb. 4, 2004, the contents of which are incorporated herein by reference thereto.

The application is a continuation-in-part of U.S. patent application Ser. No. 10/078,961, filed Feb. 20, 2002, the contents of which are incorporated herein by reference thereto.

DESCRIPTION

1. Technical Field

This present invention relates generally to airbags or inflatable cushions for vehicles. More specifically, the present invention relates to systems and methods for controlling the deployment of an inflatable cushion of an airbag module.

2. Background

Airbag modules have become common in modern automobiles. An airbag module typically comprises an inflatable cushion and an inflator within a housing. The module is installed in a desired position within the vehicle, such as the steering wheel, the dashboard, the seat, vehicle doors, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to tie the inflation level of the inflatable cushion to specific conditions. For example, dual stage inflators have been used to increase or decrease the level of inflation of the inflatable cushion. Alternatively, variable venting schemes have been used to direct a portion of a generated inflation gas away from the cushion. Further, variable tethering systems have been used to restrict or vary the overall cushion volume.

Accordingly, it is desirable to provide an airbag module with a tether or tethering system that is used to vary the amount of inflation force provided to the inflatable cushion depending upon its distance away from the housing.

SUMMARY

Disclosed herein is a device and method for manipulating the deployment characteristics of an inflatable cushion of an airbag module. The device having a tether being secured to an interior surface of the cushion at one end and a portion of the airbag module at the other wherein inflation of the cushion past a pre-determined point causes the tether to cover a vent opening of the airbag module.

An air bag venting control system for use in a vehicle is provided. The system comprises a housing, an inflatable cushion, and an inflator, and a means for covering and/or uncovering a vent opening as the cushion inflates. The housing is installable in the vehicle in a selected spatial relation to a seating structure. The inflatable cushion is stored in an un-deployed position in the housing such that it can be deployed towards the seating structure.

An air bag module, having a housing with at least one vent opening; an inflatable cushion being stored in an un-deployed position in the housing; an inflator for inflating the inflatable cushion, the inflator being in fluid communication with the inflatable cushion; a deployable member being configured to cover at least one vent opening and being secured to the inflatable cushion at one end and a portion of the airbag module at the other, the at least one vent opening is in fluid communication with an exterior of the housing until a predetermined inflation of the cushion is achieved.

A method for varying the venting of an inflatable cushion of an airbag module, by covering a vent opening in a housing with a deployable member. The deployable member being configured to cover venting apertures of the airbag module, when the inflatable cushion of the airbag module is fully deployed in a first direction.

The above-described and other features of the present disclosure will be appreciated and understood by those skilled in the art from the following detailed description, drawings, and appended claims.

DRAWINGS

FIG. 16A is an enlarged view of a portion of FIG. 16;

DESCRIPTION OF EXEMPLARY EMBODIMENTS

Reference is made to the following commonly owned and assigned U.S. patent application Ser. No. 10/295,932, filed Nov. 15, 2002, attorney docket no. DP-306604; Ser. No. 10/318,913, filed Dec. 13, 2003, attorney docket no. DP-305523; Ser. No. 10/353,661, attorney docket no. DP-306643, filed Jan. 29, 2003; and Ser. No. 10/078,961 filed Feb. 20, 2002; and U.S. Pat. Nos. 6,545,300; 6,422,597; 6,561,545; and 6,390,501, the contents each of which are incorporated herein by reference thereto.

Disclosed herein is a method and apparatus for selectively controlling the venting of an airbag module through the use of a tether or deployable member disposed within the inflatable cushion and about a portion of the inflator and a vent opening of the housing containing the inflator and the inflatable cushion. The tether is secured to an inner surface of the inflatable cushion at one end and the housing at the other wherein a portion of the tether provides a means for sealing and unsealing a vent aperture of the airbag module housing. In addition and in one exemplary embodiment, the vent aperture is directly aligned with at least one inflation opening of the inflator. Alternatively, the vent aperture and the inflator openings may be misaligned or multiple vent openings are provided on both the housing and the inflator wherein some of the vent apertures are directly aligned with the inflator openings and some are misaligned.

Figure 1:
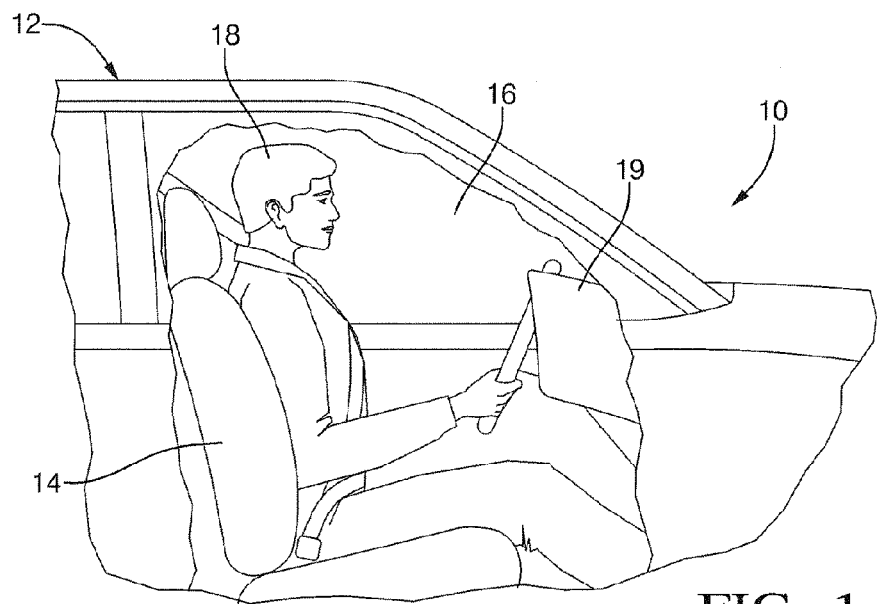
FIG. 1 is a side elevational view of a frontal air bag system, according to the present invention, illustrated in operational relationship with an occupant in a vehicle.
Figure 2:
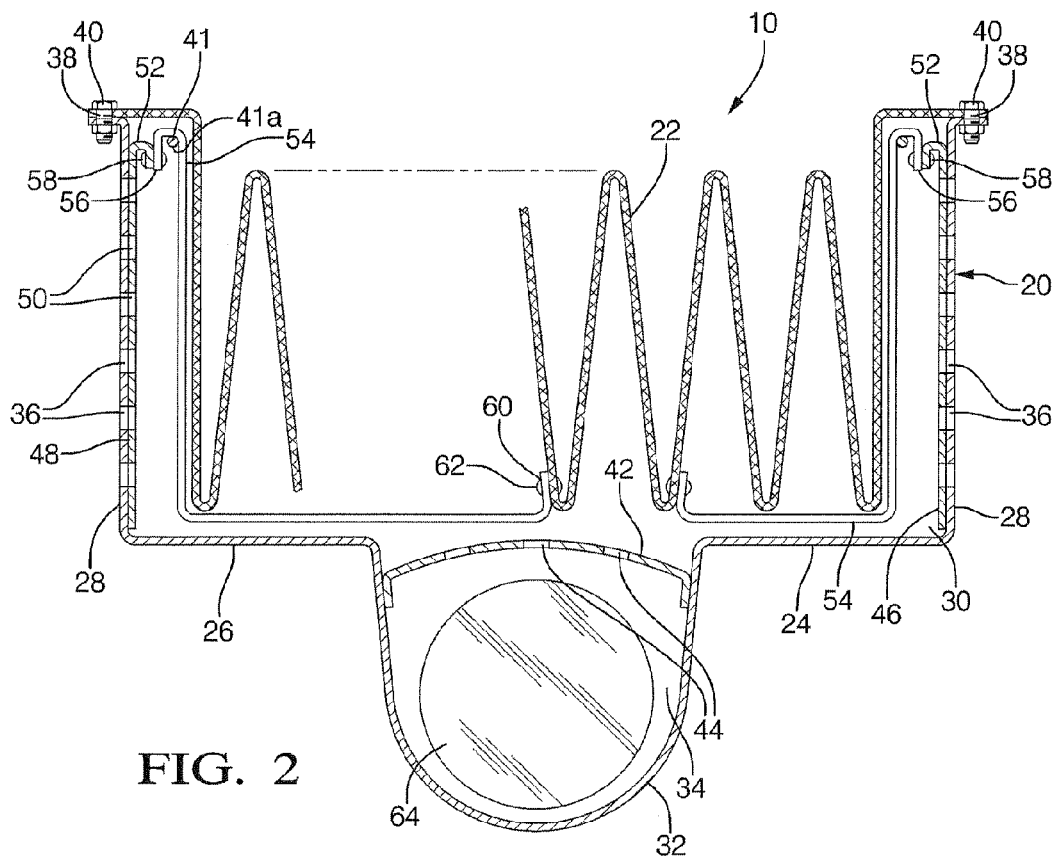
FIG. 2 is a fragmentary plan view of the frontal air bag system of FIG. 1.

Referring to the drawings and in particular FIGS. 1 and 2, one embodiment of a frontal air bag system 10, according to the present invention, is shown for a vehicle (partially shown), generally indicated at 12. The vehicle 12 includes a seat 14 mounted by suitable means (not shown) to vehicle structure (not shown) in an occupant compartment 16 of the vehicle 12. The vehicle 12 also includes a door (not shown) disposed adjacent the seat 14 and generally perpendicular thereto. The door is connected by suitable means (not shown) to vehicle structure (not shown). An occupant 18 is typically seated in the seat 14 adjacent the door. The vehicle 12 further includes an instrument panel 19 spaced forwardly from the seat 14 and extending laterally across the occupant compartment 16. It should be appreciated that, in the embodiment illustrated, the frontal air bag system 10 is mounted in the instrument panel 19 and acts as a frontal restraint for the occupant 18 on the passenger side of the occupant compartment 16. It should also be appreciated that the frontal air bag system 10 may be used for a driver, passenger or side air bag application. It should further be appreciated that, except for the frontal air bag system 10, the vehicle 12 is conventional and known in the art.

Referring to FIGS. 1 through 6, the frontal air bag system 10, according to the present invention, includes an air bag module, generally indicated at 20, mounted to the instrument panel 19 and an air bag 22 disposed within the air bag module 20 for deployment rearwardly toward the occupant 18. The air bag 22 is a single panel having a generally rectangular shape. The air bag 22 is made of a fabric material such as nylon or polyester as is known in the art.

The air bag module 20 includes an outer housing 24 mounted to the instrument panel 19 by suitable means such as fasteners (not shown). The outer housing 24 is generally rectangular in shape and made of a rigid material such as plastic. The outer housing 24 has a base wall 26 extending laterally and a plurality of side walls 28 extending generally perpendicular to the base wall 26 to form a chamber 30 therein. The base wall 26 also has a recessed portion 32 extending away from the chamber 30 and having a generally "U" shape to form an inflator cavity 34. The side walls 28 have a plurality of apertures or vents 36 extending therethrough for a function to be described. The side walls 28 also have an outer flange 38 extending laterally outwardly and generally perpendicularly to the side walls 28 at a free end thereof. The air bag 22 has an edge secured to the outer flange 38 by suitable means such as fasteners 40. The side walls 28 may also have an inner flange 41 extending laterally outwardly and generally perpendicularly to the side walls 28 with an aperture 41a extending therethrough for a function to be described. The outer housing 24 is a monolithic structure being integral, unitary and one-piece. It should be appreciated that the side walls 28 would be perforated with rows of vents 36. It should further be appreciated that a door or cover (not shown) closes the open end of the outer housing 24.

The air bag module 20 also includes an inflator or diffuser panel 42 extending across the inflator cavity 34 and secured to the recessed portion 32 of the base wall 26 by suitable means such as fasteners (not shown). The inflator panel 42 has a plurality of apertures 44 extending therethrough for a function to be described. The inflator panel 42 is made of rigid material such as plastic.

The air bag module 20 includes an inner housing 46 disposed in the chamber 30 of the outer housing 24. The inner housing 46 has a plurality of side walls 48 extending through the apertures 41a in the inner flanges 41 of the side walls 28 and forming a generally rectangular shape with open ends. The side walls 48 have a plurality of apertures or vents 50 extending therethrough that are aligned initially with the vents 36 in the outer housing 24 when the inner housing 46 is in a predetermined position relative to the outer housing 24. The side walls 48 have a flange 52 extending laterally inward and generally perpendicular to the side walls 48 at a one end adjacent the open end of the outer housing 24 for a function to be described. It should be appreciated that the side walls 48 would be perforated with rows of vents 50.

The frontal air bag system 10 includes at least one, preferably a plurality of tethers 54 interconnecting the air bag 22 and the inner housing 46. Each of the tethers 54 have a first end 56 connected to one of the flanges 52 of the side walls 48 by suitable means such as fasteners 58. Each of the tethers 54 have a second end 60 connected to a mid portion of the air bag 22 by suitable means such as fasteners 62. It should be appreciated that inflation of the air bag 22 pulls the tethers 54 taunt to move the inner housing 46 relative to the outer housing 20.

The frontal air bag system 10 further includes an inflator 64 disposed in the inflator cavity 34 between the recessed portion 32 of the base wall 26 and the inflator panel 42 for inflating the air bag 20. The inflator 64 extends axially along the inflator cavity 34 and is generally cylindrical in shape. The inflator 64 may include an inflator bracket (not shown) to mount the inflator 64 to the base wall 26 of the outer housing 20 by suitable means such as fasteners (not shown). The inflator 64 includes a central pyrotechnic unit and may include a rupture disc or diffuser (not shown) having a plurality of apertures (not shown) to allow the gas to pass therethrough. The inflator 64 includes an electrical connector (not shown) connected to a source of power (not shown) for activating the central pyrotechnic unit. It should be appreciated that the central pyrotechnic unit of the inflator 64 is activated by the source of power to expel a gas into the inflator cavity 34 and through the apertures 44 in the inflator panel 42 to inflate the air bag 22.

Figure 3:
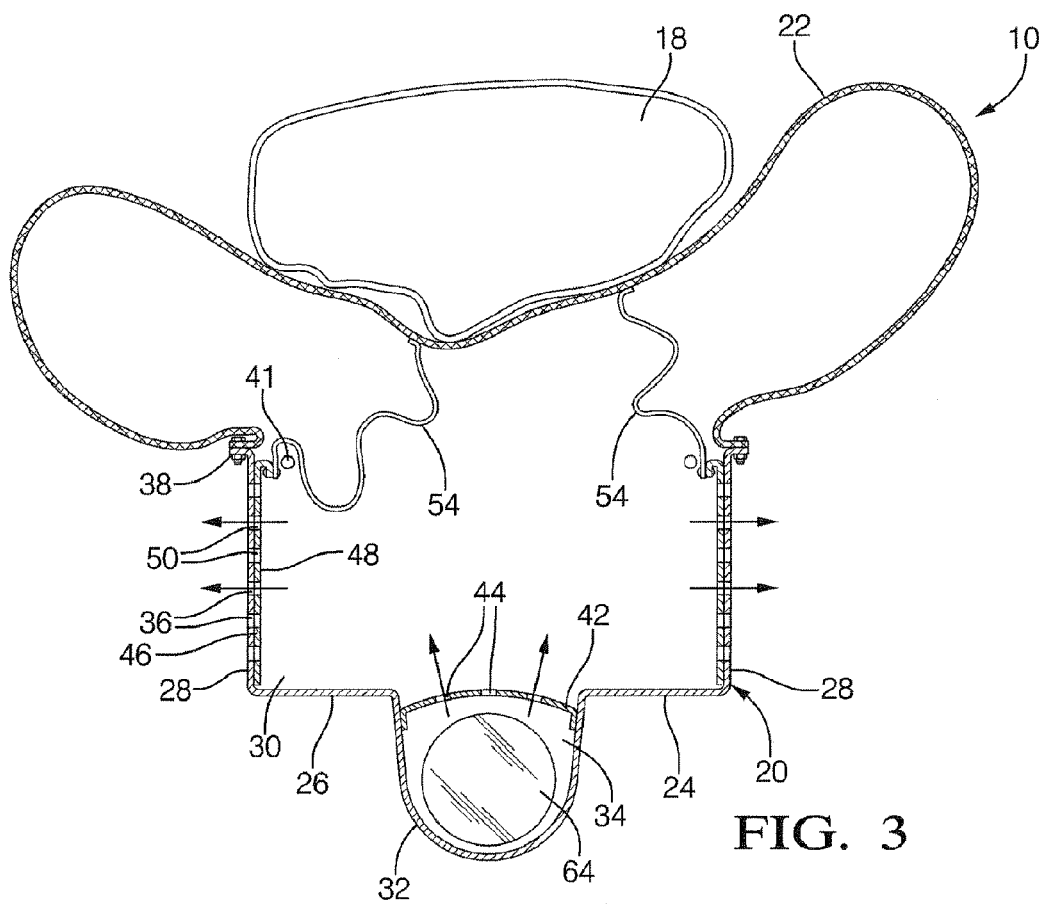
FIG. 3 is a view similar to FIG. 2 illustrating a first operational state of the frontal air bag system of FIG. 1.

In operation, the frontal air bag system 10 is mounted in the instrument panel 19 and the air bag 22 is in a folded stowed position as illustrated in FIG. 2. The vents 50 in the inner housing 46 are aligned with the vents 36 in the outer housing 24. When the vehicle 12 experiences a collision-indicating condition of at least a predetermined threshold level, an electrical signal is sent to the inflator 64. The inflator 64 is activated and a gas is expelled by the central pyrotechnic unit into the inflator cavity 34 and through the apertures 44 in the inflator panel 42 and into the air bag 22 as indicated by the arrows in FIG. 3. Gas enters the air bag 22 and does not initially escape through the vents 36 and 50 because of interference between the material of the air bag 22 and the vents 36 and 50. The air bag 22 deploys as it is filled to extend into the occupant compartment 16 of the vehicle 12 between the occupant 18 and the instrument panel 19 as illustrated in FIG. 3. The tethers 54 have slack and the vents 36 and 50 are aligned so that the gas can escape to atmosphere. It should be appreciated that once the air bag 22 is partially deployed the gas would aspirate or exhaust through the vents 50 and 36, which are still aligned, as indicated by the arrows in FIG. 3.

Figure 4:
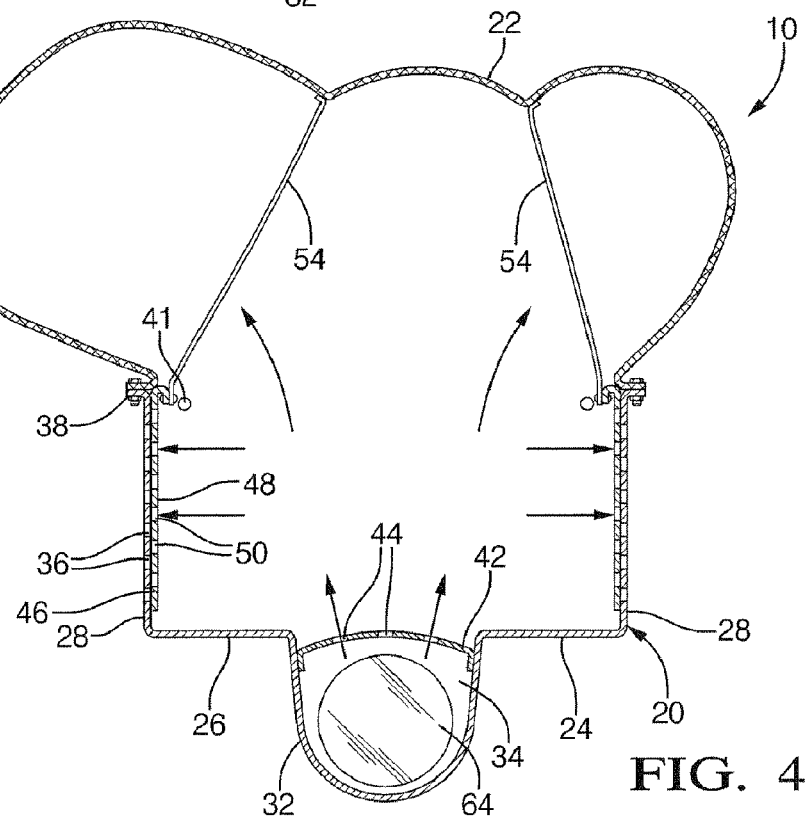
FIG. 4 is a view similar to FIG. 2 illustrating a second operational state of the frontal air bag system of FIG. 2.

The vents 36 and 50 exhaust or vent gas if the occupant 18 is in close proximity and seated in the seat 14 to avoid building pressure in the air bag 22 early in the deployment. Otherwise, when the occupant 18 is normally seated in the seat 14, the vents 36 and 50 would aspirate for a few milliseconds until the tethers 54 are pulled taunt. Once taunt, upon further inflation and deployment of the air bag 22, the tethers 54 pull the inner housing 46 up slightly to a closed position relative to the outer housing 24 where the vents 36 and 50 do not line up and the gas cannot escape through the outer housing 24 as illustrated in FIG. 4. The occupant 18 will typically interact with the deployed air bag 22.

Figure 5:
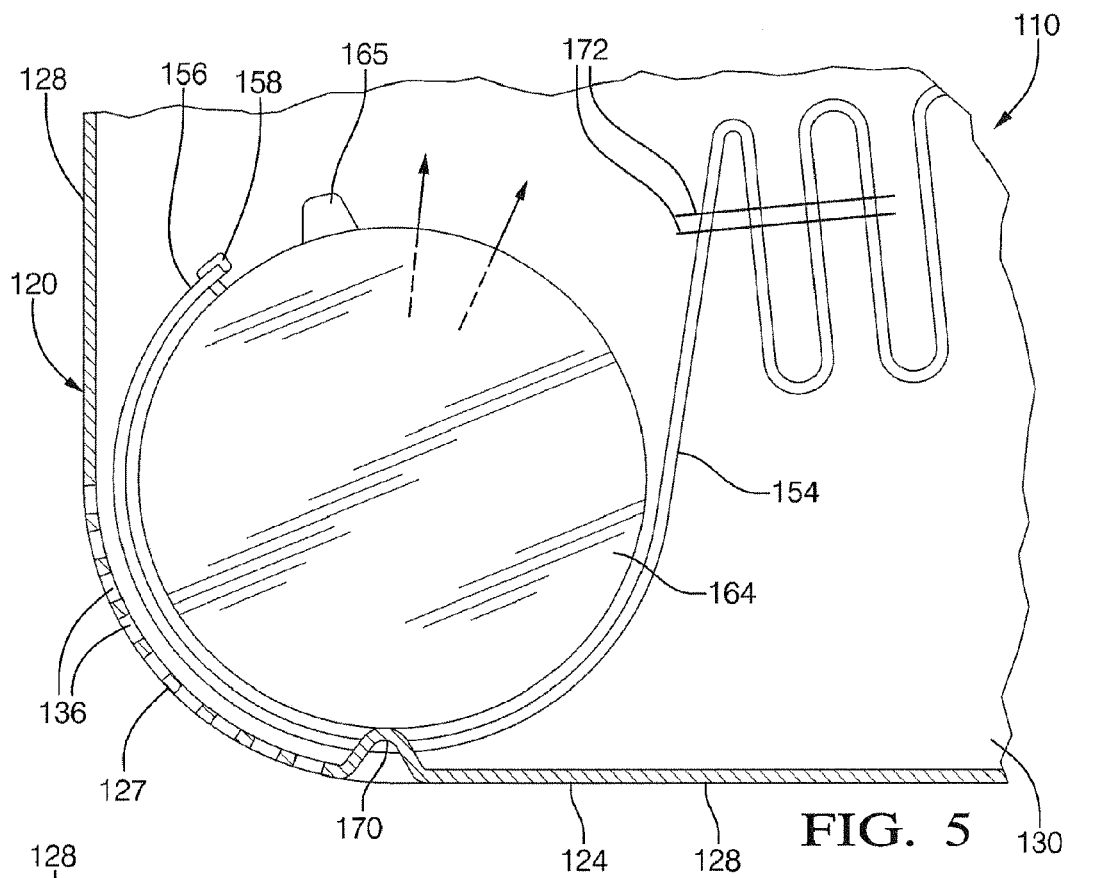
FIG. 5 is an enlarged view of a portion of another embodiment, according to the present invention, of the frontal air bag system of FIG. 2 illustrating the first operational state.
Figure 6:
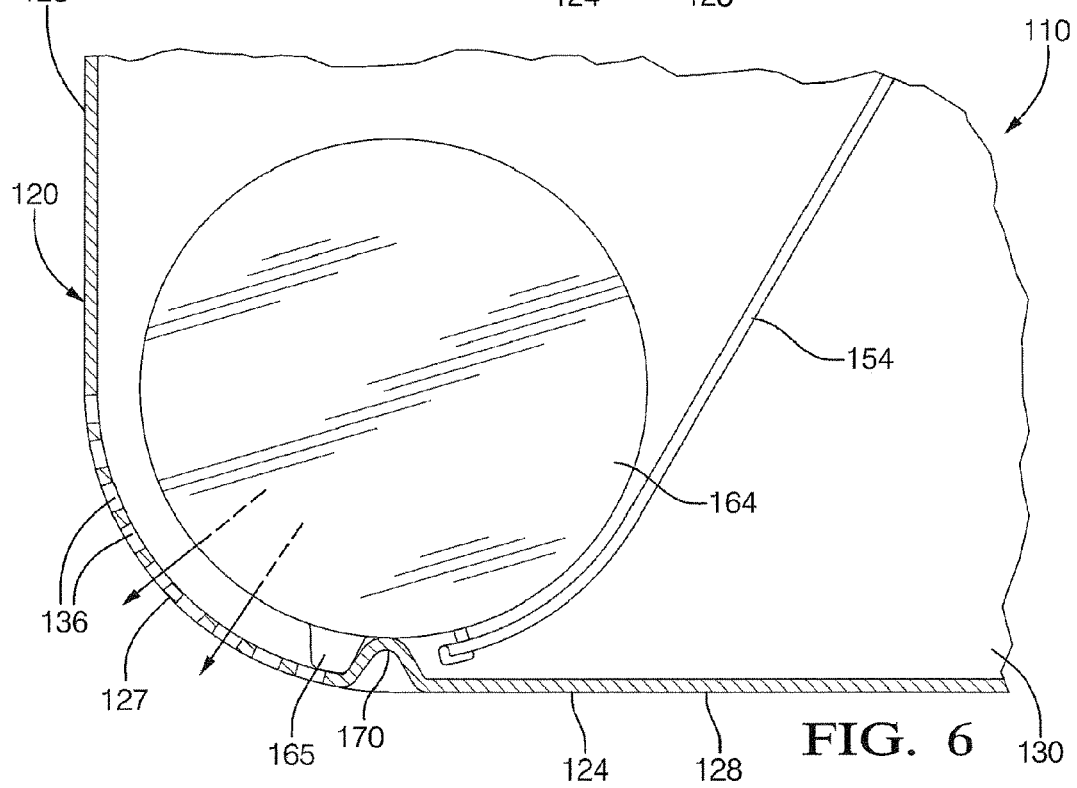
FIG. 6 is a view similar to FIG. 5 illustrating the second operational state of the frontal air bag system of FIG. 5.

Referring to FIGS. 5 and 6, another embodiment 110, according to the present invention, of the frontal air bag system 10 is shown. Like parts of the frontal air bag system 10 have like reference numerals increased by one hundred (100). In this embodiment, the frontal air bag system 110 eliminates the inner housing and recessed portion of the outer housing 124. The outer housing 124 has the base wall 126 and side wall 128 forming an arcuate corner portion 127 therebetween. The corner portion 127 has the vents 136 extending therethrough. The outer housing 124 has a rib or projection 170 extending into the chamber 130. The frontal air bag system 110 has the inflator 164 disposed adjacent the corner portion 127 and includes a rib or projection 165 extending outwardly to cooperate with the rib 170 on the outer housing 124. The frontal air bag system 110 has the first end 156 of the tether 154 connected to the inflator 164 by suitable means such as the fastener 158 and the second end is connected to the air bag. The frontal air bag system 110 may also include one or more break-away stitches 172 in the tether 154 for a function to be described.

In operation, the frontal air bag system 110 is mounted in the instrument panel 19 and the air bag is in a folded stowed position as illustrated in FIG. 5. When the vehicle 12 experiences a collision-indicating condition of at least a predetermined threshold level, an electrical signal is sent to the inflator 164. The inflator 164 is activated and a gas is expelled by the central pyrotechnic unit into the chamber 130 and into the air bag as indicated by the arrows in FIG. 5. Gas enters the air bag and fills to deploy the air bag. The air bag deploys as it is filled to extend into the occupant compartment 16 of the vehicle 12 between the occupant 18 and the instrument panel 19. When the occupant 18 is normally seated in the seat 14, a normal deployment of the air bag pulls on the tethers 154 to rotate the inflator 164 to align the inflator 164 with the vents 136 in the corner portion 127 of the outer housing 124. Gas aspirates through the vents 136 for a few milliseconds until the projection 165 contacts the projection 170 and the tethers 154 are initially pulled taunt as illustrated in FIG. 6. Once initially taunt, upon further inflation and deployment of the air bag, the tethers 154 pull apart or break the break away stitches 172 and pull the tethers 154 fully taunt. Once fully taunt, the tethers 154 pull or rotate the projection 165 on the inflator 164 past the projection 170 on the outer housing 124 and the gas cannot escape through the outer housing 124, but continues to inflate the air bag to full deployment. The occupant 18 will typically interact with the deployed air bag. It should be appreciated that the corner portion 127 may not include the vents 136 and that the inflator panel or the tethers 154 themselves may include the vents 136 and cover the inflator 164 to vent the gas in an initial position before the inflator 164 is rotated.

Figure 7:
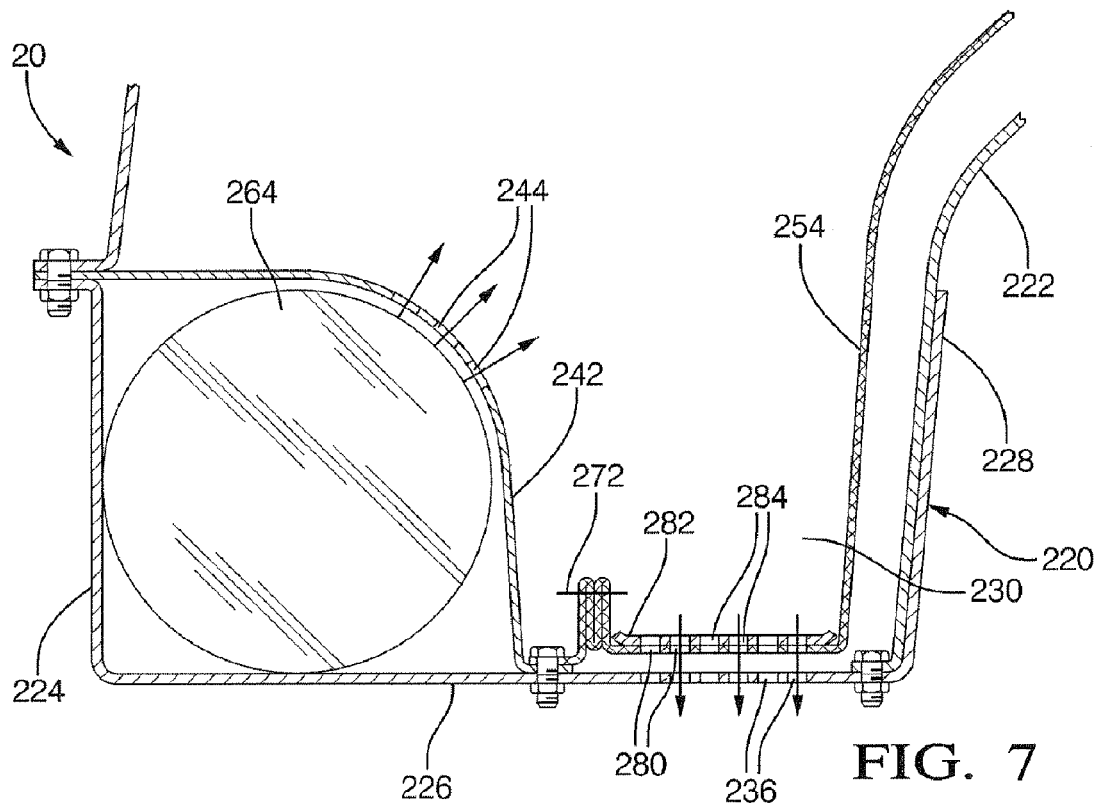
FIGS. 7 and 8 are enlarged views of a portion of yet another embodiment, according to the present invention, of the front air bag system of FIG. 2 illustrating first and second operational states thereof.
Figure 8:
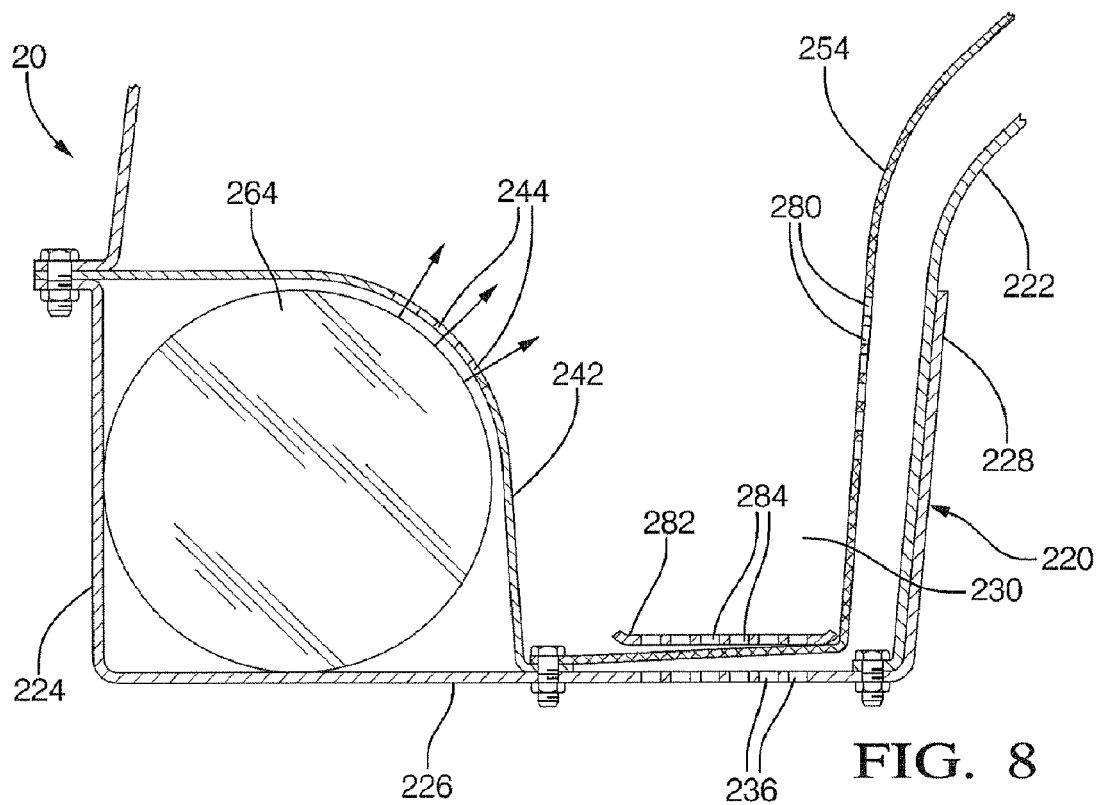

Referring to FIGS. 7 and 8, yet another embodiment 210, according to the present invention, of the frontal air bag system 10 is shown. Like parts of the frontal air bag system 10 have like reference numerals increased by two hundred (200). In this embodiment, the frontal air bag system 210 eliminates the inner housing and recessed portion of the outer housing 224. The outer housing 224 has the base wall 226 with the vents 236 extending therethrough. The frontal air bag system 210 has the inflator 264 disposed adjacent the corner of the housing 224 and the inflator panel 242 has apertures 244 aligned with the gas diffusing from the inflator 264. The frontal air bag system 210 has the first end 256 of the tether 254 connected to the base wall 226 of the housing 224 by suitable means such as the fastener 258 and the second end is connected to the air bag 222. The tether 254 has one or more vents or apertures 280 extending through a portion thereof. The frontal air bag system 210 also includes one or more break-away stitches 272 in the tether 254 to align the vents 280 of the tether 254 with the vents 236 of the housing 224 in an initial position for a function to be described. The frontal air bag system 210 may include a retainer 282 connected to the housing 226 to retain the tether 254 in its initial position. The retainer 282 has a plurality of apertures 284 aligned with the vents 280 and 236.

In operation, the frontal air bag system 210 is mounted in the instrument panel 19 and the air bag 222 is in a folded stowed position as illustrated in FIG. 7. The vents 280 in the tether 254 are aligned with the vents 236 in the outer housing 224. When the vehicle 12 experiences a collision-indicating condition of at least a predetermined threshold level, an electrical signal is sent to the inflator 264. The inflator 264 is activated and a gas is expelled by the central pyrotechnic unit through the apertures 244 in the inflator panel 242 into the chamber 230 and into the air bag 222 as indicated by the arrows in FIG. 7. Gas enters the air bag 222 and fills to deploy the air bag 222. The air bag 222 deploys as it is filled to extend into the occupant compartment 16 of the vehicle 12 between the occupant 18 and the instrument panel 19. The tethers 254 have slack and the vents 236 and 280 are aligned with the apertures 284 in the retainer 282 so that the gas can escape to atmosphere. It should be appreciated that once the air bag 222 is partially deployed the gas would aspirate or exhaust through the vents 280 and 236, which are still aligned, as indicated by the arrows in FIG. 7.

The vents 236 and 280 exhaust or vent gas if the occupant 18 is in close proximity and seated in the seat 14 to avoid building pressure in the air bag 222 early in the deployment. Otherwise, when the occupant 18 is normally seated in the seat 14, the vents 236 and 238 would aspirate for a few milliseconds until the tethers 254 are pulled taunt. Once taunt, upon further inflation and deployment of the air bag 222, the tethers 254 pull apart or break the break away stitches 272 and pull the tethers 254 fully taunt where the vents 236 and 280 do not line up and the gas cannot escape through the outer housing 224 as illustrated in FIG. 8. The occupant 18 will typically interact with the deployed air bag 222.

Figure 9:
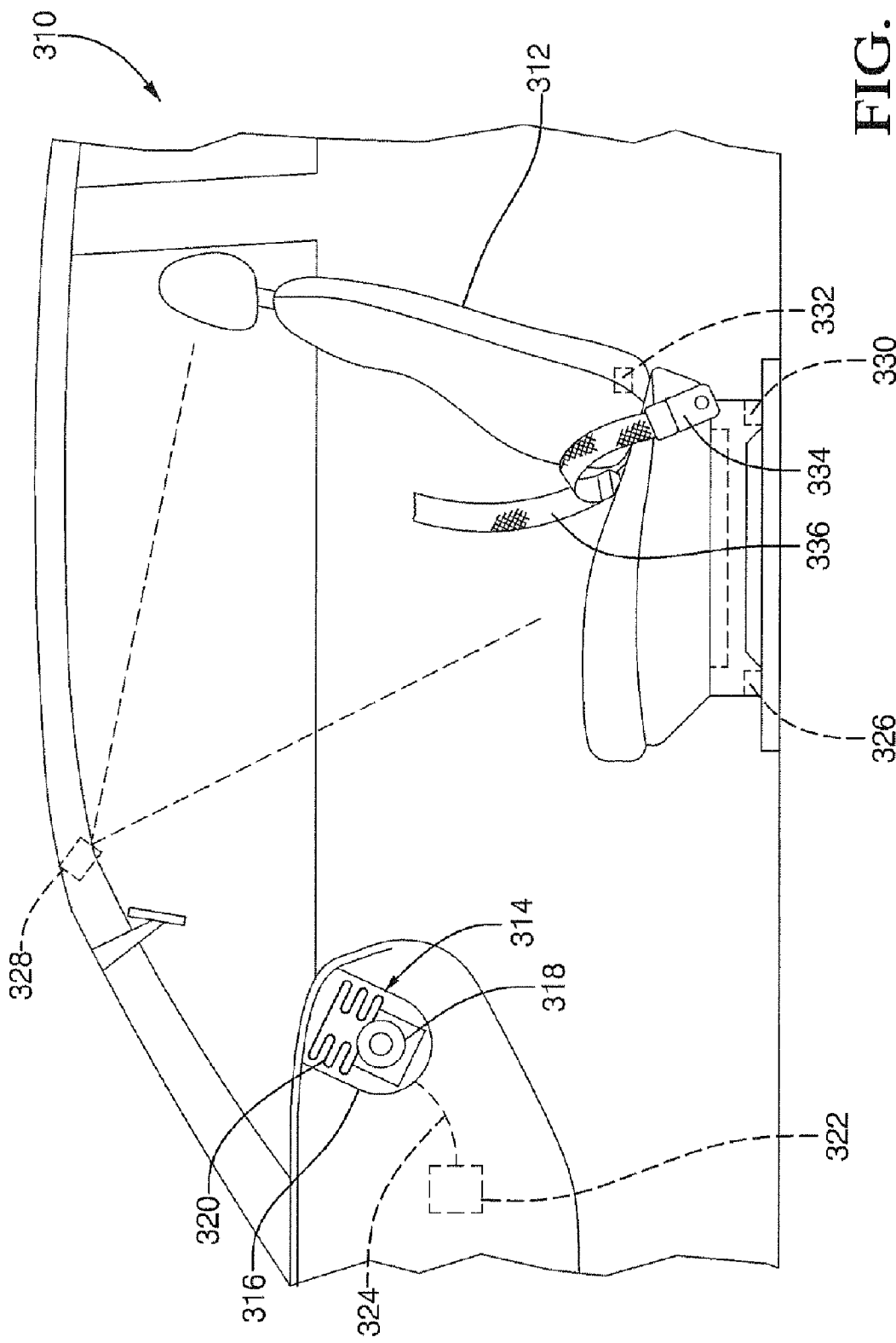
FIG. 9 is a partial view of a vehicle interior showing an air bag cushion in a stored or un-deployed state.

Referring now to the FIGS. 9-25F exemplary embodiments of the present invention are illustrated, referring in particular to FIG. 9 a portion of an interior of a vehicle 310 is illustrated. Included in the interior compartment of vehicle 310 is a seating structure 312 and an air bag module 314 disposed in a selected spatial relationship with respect to seating structure 312. The air bag module 314 comprises a housing 316, an inflator 318, and an inflatable air bag or cushion 320. The module 314 is positioned in the vehicle 310 for deployment of the cushion 320 towards the seating structure 312.

A sensor or sensing-and-diagnostic module 322 is adapted to detect an activation event wherein the occurrence of a threshold event will cause an activation signal 324 to be generated and received by the inflator 318, thereby causing the inflator to inflate the inflatable cushion by providing an inflation output. The detection of the threshold event is determined by one or more sensors that are disposed about the vehicle in accordance with known technologies. Thus, the activation signal 324 controls the activation of the airbag module 314.

The inflatable cushion is stored in a folded or undeployed position in housing 316. The cushion is positioned to be in fluid communication with the inflator 318 wherein generation of the inflation output or inflating gas will cause the cushion to inflate. Upon detection of an activation event by the sensing-and-diagnostic module 322, the inflator 318 is activated via signal 324 to generate the inflation gas. The inflation gas causes the cushion 320 to inflate and expand from housing 316 into the interior of the vehicle. It should be recognized that module 314 is illustrated by way of example only as being included in the dashboard of the vehicle. Of course, it is contemplated that module 314 can be installed for deployment in other regions of the vehicle, such as, but not limited to the steering wheel, the seat, the A-pillar, the roof, and other locations as well as other angular or positional relationships illustrated in FIG. 9. Moreover, the specific configurations of the vehicle interior, instrument panel, airbag module and relationship with regard to the same are provided as an example and it is, of course, understood that these configurations may vary from the specific configurations illustrated in FIG. 9.

Additionally, the present disclosure is also contemplated for use with various types of inflatable cushions and inflators. For example, cushions which are folded in a particular manner to achieve various deployment configurations and various types of inflators (e.g., dual stage inflators).

In addition, and in accordance with the present disclosure, the sensing-and-diagnostic module can also be adapted to detect one or more conditions of the seating structure. For example, sensing-and-diagnostic module 322 can be adapted to detect one or more of the following: a load or amount of load (e.g., occupant weight) on the seating structure 312, a position of the seating structure, an angle of a portion of the seating structure with respect to another portion, the distance the seating structure is from the air bag module 314, and other data that is relevant to the deployment of the airbag by receiving input from a plurality of sensors disposed about the vehicle.

For example, the sensing-and-diagnostic module can receive inputs from one or more sensors such as, but not limited to, a seat position sensor 326, an optical scanner 328, a load sensor 330, a seat recline sensor 332, a seat belt use detection sensor 334, and a belt tensioning sensor (not shown). The sensors are positioned to provide input signals to module 322 indicative of one or more seat conditions. The one or more seat conditions combined with an occupant's size (e.g., weight determined by sensors) is inputted in a control algorithm resident upon a microprocessor disposed within the sensing and diagnostic module in order to determine a desired deployment scheme for the inflatable cushion. For example, the data inputs when compared to a look up table stored in the memory of the microprocessor or other readable format will allow the algorithm to determine whether a full deployment or partial deployment of the airbag is desired (e.g., tailoring of the airbag module by activating or not activating a system designed to modify the cushion deployment characteristics).

The continuous sampling of the various sensors allows the sensing and diagnostic module to be provided with various inputs before an activation event (deployment) occurs. It is noted that the venting system of the present disclosure is contemplated for use with any combination of the aforementioned sensors and it is not intended to be limited by the specific types of sensors discussed above.

The seat position sensor detects the position or distance of seating structure 312 with respect to air bag module 314. Similarly, the optical scanner 328 can be used to detect the position of seating structure 312. The load sensor 330 is disposed within the seating structure 312 and can be used to detect the load on the seating structure. Thus, sensor 330 is capable of detecting the specific weight or load on a portion of seating structure 312. The seat recline sensor 332 can be used to detect the degree or angle to which an upper or back portion of the seating structure 312 is reclined or positioned with respect to a lower or seat portion of seating structure 312. The seat belt use detection sensor 334 can determine whether the seat belt 336 is secured (e.g., buckled is inserted into its corresponding clasp). The seat belt tensioning sensor, alone or in combination with the load sensor 330, can also be used determine the load on the seating structure 312.

In accordance with an exemplary embodiment of the present invention, inflation energy or gas input to the cushion is controlled by a tether that is secured to the inflatable cushion at one end and a portion of the airbag module at the other. The tether has a predetermined length that is folded with the housing and the inflatable cushion. During an initial stage of deployment a vent opening in the housing is uncovered and as the cushion moves towards full deployment in a first direction, a portion of the tether is positioned to cover the vent opening. This is due to the tether being positioned proximate to the openings and the same is folded in such a manner that the tether does not block the vent opening until a predetermined amount of tether is unfurled by the inflating cushion. The movement or unraveling of the tether is facilitated by the inflating cushion. Thus, if inflation of the cushion in a first direction is obstructed the output of the inflator will be allowed to vent out of the vent opening of the housing.

An exemplary embodiment of the present invention shuts off or prevents venting or direct venting of the inflator gas by means of a tether that closes off an opening in the housing directly aligned with the vents. Alternatively, the opening may be offset from vents of the inflator or a plurality of openings may be disposed in the housing some aligning with the vents of the diffuser and some not.

As the deployment begins, the vent will be open (or will open after minimal cushion travel to aid in deployment door opening (e.g., no venting during initial punch out phase of deployment to provide a larger door opening force)) and inflation gas from the inflator will be allowed to exit through the housing by the vents of the inflator, which are in close proximity to the openings in the housing. This will occur for a short time until the cushion extends inwardly into the vehicle and the tether pulls the vent closed. A non-limiting example of an application requiring such a configuration is airbag door panels that may require larger opening forces for example, some invisible tear seam door panels (e.g., no tear seam visible from the exterior). These configurations sometimes require a larger opening force than door panels with visible seams. Another non-limiting example is an airbag module positioned within the vehicle wherein the door panel swings or pivots in an area that is highly unlikely to have an occupant in close proximity to the deployable door, as it swings open. Conversely, doors positioned in a facing spaced relationship with respect to the occupant are contemplated for use with exemplary embodiments wherein the tether is positioned to vent first and cover the vent as the inflatable cushion deploys towards the occupant.

If the tether is not fully extended the vent will remain open and a large portion of the inflation energy will be vented out of the back side or side of the module disposed away from the deploying cushion. If on the other hand the tether is allowed to fully extend, the gas lost through venting will be less, and may be supplemented by a secondary stage of the inflator.

In accordance with one exemplary embodiment, the airbag module utilizes direct venting (e.g., alignment of a vent of the inflator with a vent opening in the housing). Accordingly, the module does not have to build pressure before it begins to vent. This is helpful in reducing the initial punchout that is seen with direct contact to the deployment door. Moreover, no electrical inputs or added firing loops or no additional parts are required in at least some embodiments. Exemplary embodiments will not add additional parts that may be capable of rattling and/or adding significant weight to the module.

Referring to the drawings and in particular FIGS. 10-17, one exemplary embodiment of an air bag module 314 is illustrated. The air bag module includes an outer housing 316 for mounting to, or proximate to an instrument panel or interior surface of a vehicle by suitable means such as fasteners. Of course, the module is contemplated for mounting to other structures in the vehicle. The housing is made of an easily molded or extruded rigid material such as plastic, steel, aluminum etc.

As will be described in detail below, air bag module 314 comprises means to customize or tailor the inflation level and venting of the inflatable cushion 320. The inflation level is commensurate with the deployment range of the inflatable cushion. More specifically, venting or lack thereof of inflation gas through an opening in the housing is determined by a fully inflated cushion 320 or a partially restrained cushion 320. The inflatable cushion is made of a fabric material such as nylon or polyester as is known in the art.

Figure 10:
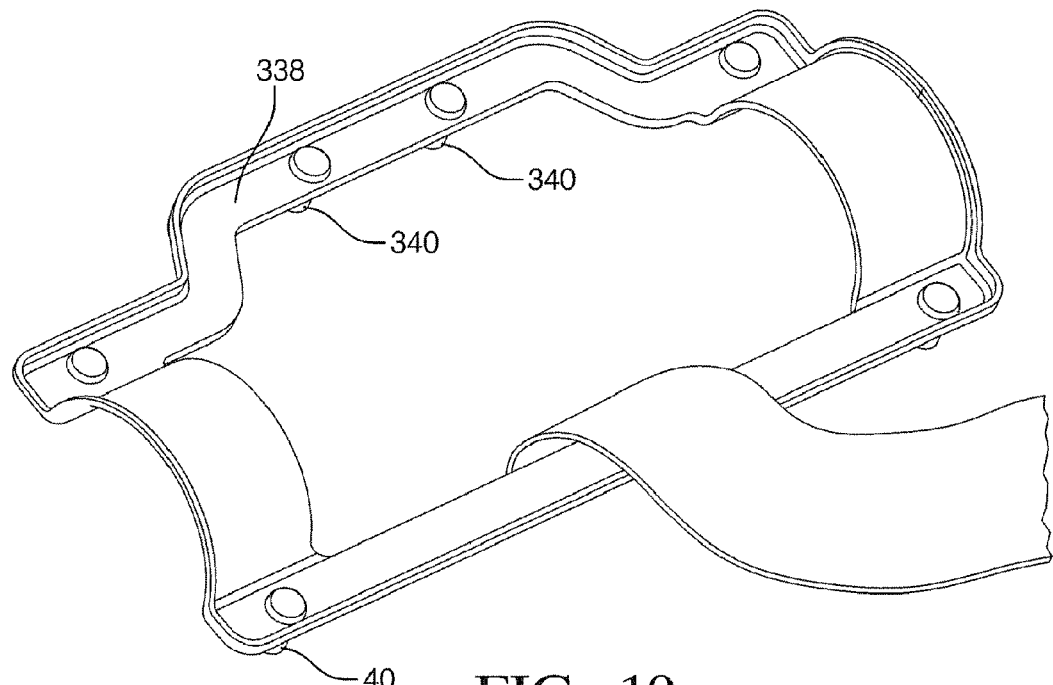
FIG. 10 is a perspective view of components of an airbag module constructed in accordance with an exemplary embodiment of the present invention.
Figure 11:
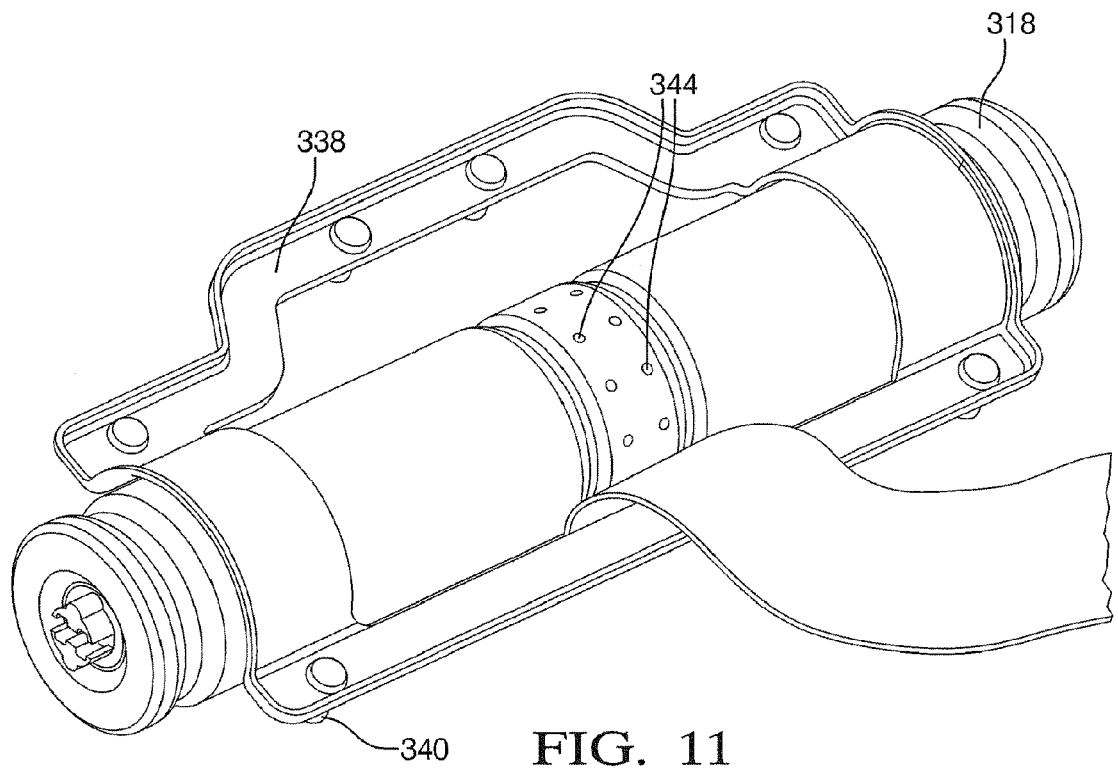
FIG. 11 is a perspective view of the components of FIG. 10 illustrated with an inflator of an airbag module constructed in accordance with an exemplary embodiment of the present invention.
Figure 12:
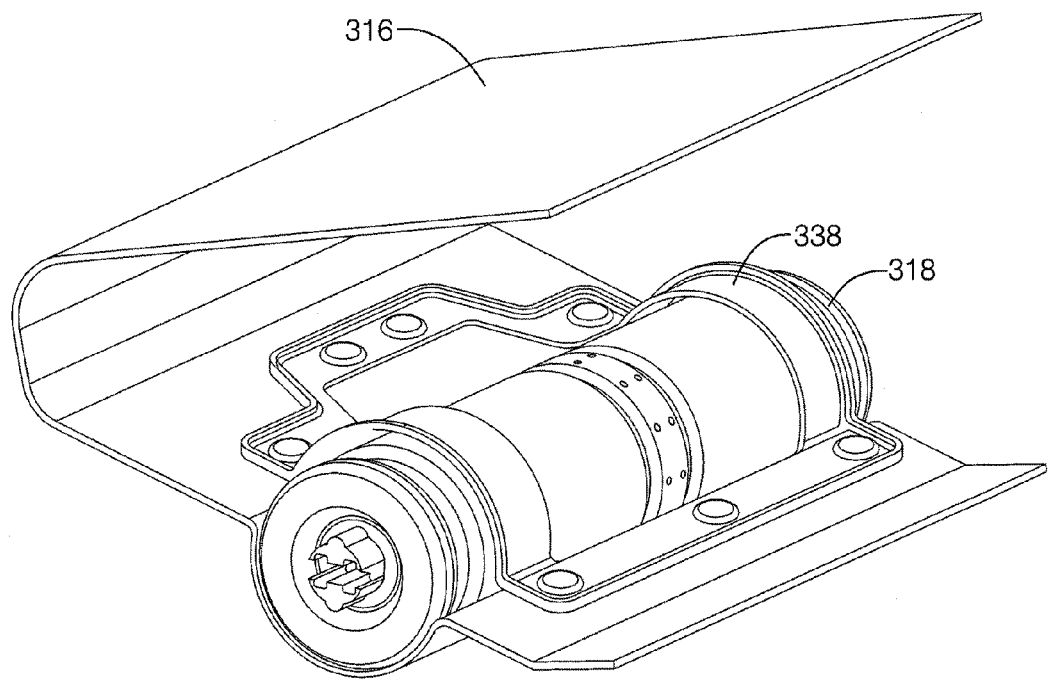
FIG. 12 is a perspective view of a partially assembled airbag module constructed in accordance with an exemplary embodiment of the present invention.

The inflatable cushion is mounted to housing 316 by a retainer 338. Retainer 338 is configured to be placed within an inflation opening of the inflatable cushion and comprises a plurality of studs or mounting means 341 which pass through openings in the inflatable cushion and secure the same to the housing by passing through openings in the housing. As illustrated in FIG. 11, a tether 340 or deployable member is illustrated. In accordance with an exemplary embodiment, tether 340 is made out of the same material as the inflatable cushion or any other material suitable for deployment and covering of the vent opening. Tether 340 is secured to an inner surface of the inflatable cushion at one end and another portion of the airbag module at the other. For example retainer 338 may provide the means for securing the tether to the airbag module. In an exemplary embodiment tether 40 is secured to the inner surface of frontal surface of the inflatable cushion. Alternatively, the tether is secured to the inflatable cushioned by a panel member 321 (illustrated by the dashed lines in FIG. 23), which is disposed between an end of the tether and the interior surface of the inflatable cushion wherein the tether is secured to a portion of the panel member at a point that is not directly secured to the inflatable cushion and two opposite ends 323 of the panel member are secured to the inflatable cushion thereby providing a greater surface contact area related to the securement location of the tether to the inflatable cushion. As illustrated in FIGS. 10-12, retainer 338 is configured to wrap around and secure an inflator 318 to housing 316.

Figure 13:
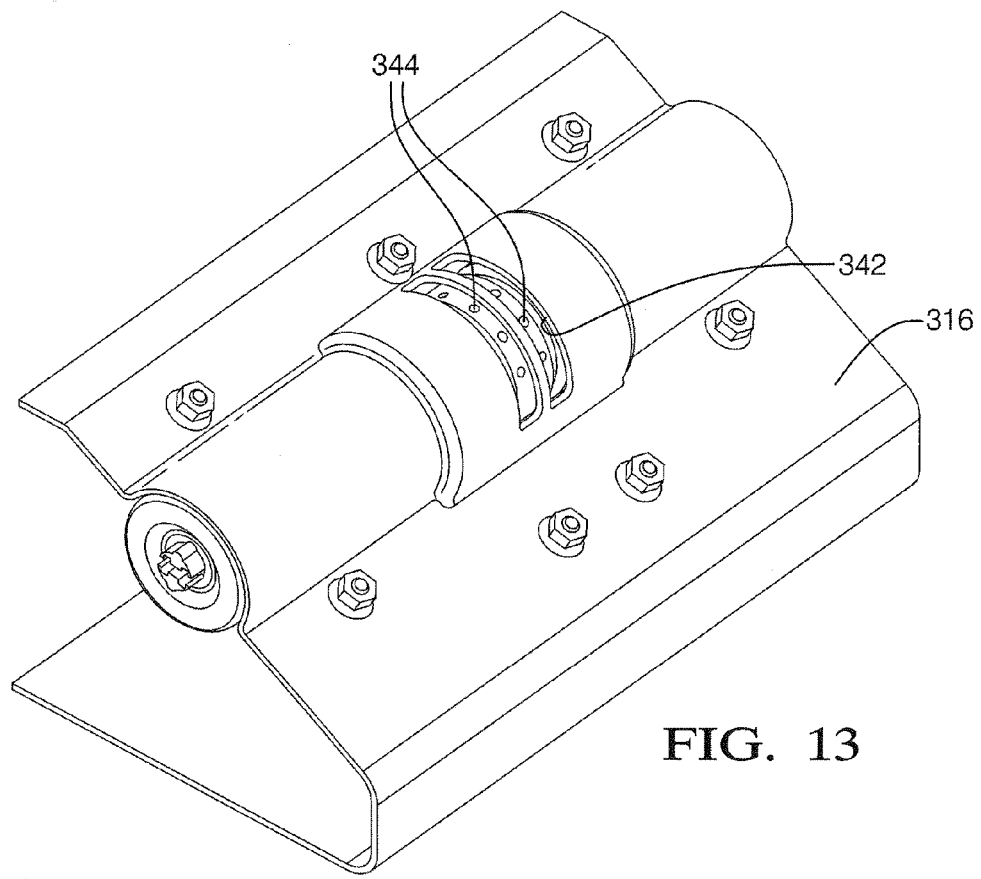
FIG. 13 is a rear perspective view of a partially assembled airbag module constructed in accordance with an exemplary embodiment of the present invention.
Figure 14:
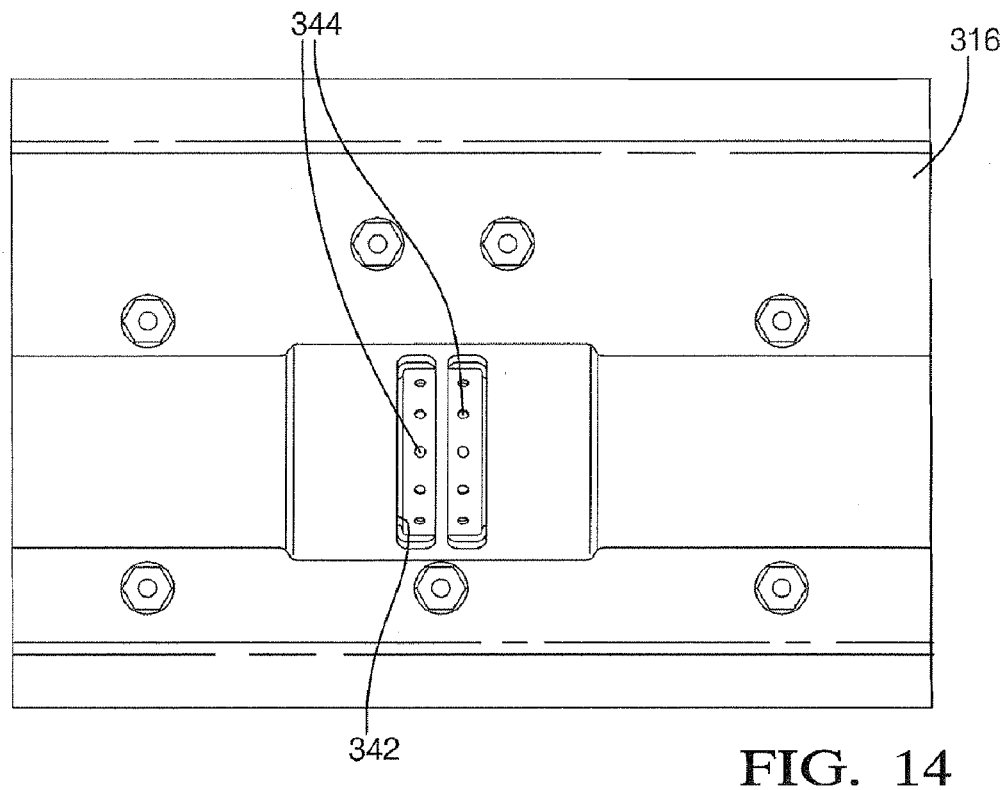
FIG. 14 is a rear view of an airbag module constructed in accordance with an exemplary embodiment of the present invention illustrating the vents openings of the housing in an uncovered state.
Figure 15:
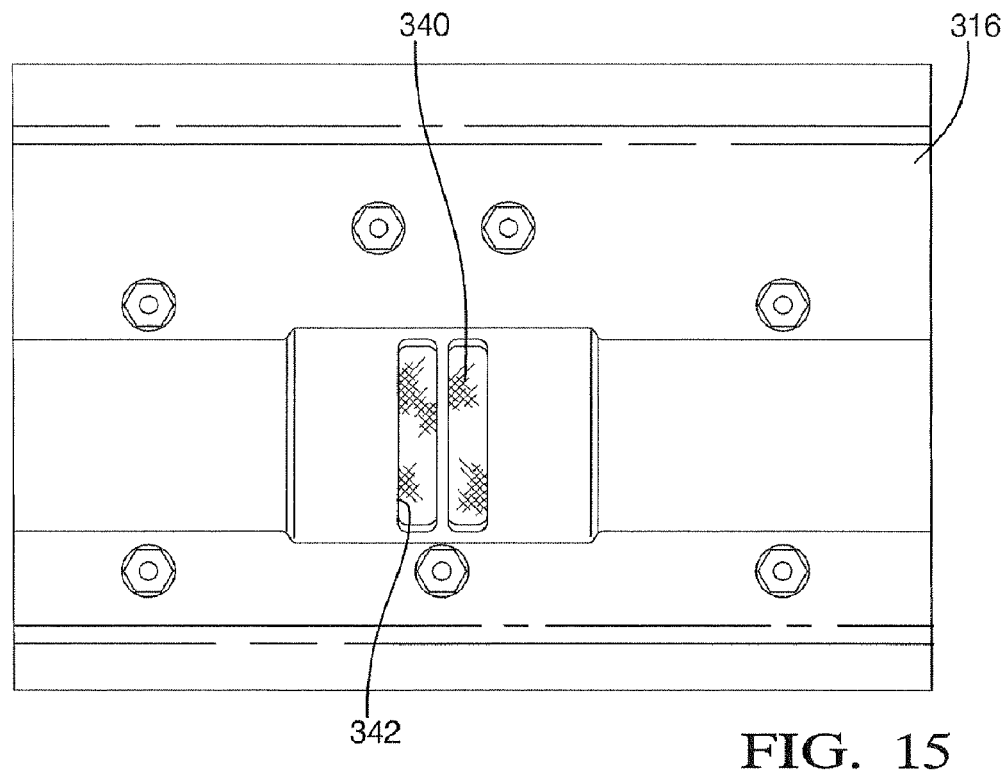
FIG. 15 is a rear view of an airbag module constructed in accordance with an exemplary embodiment of the present invention illustrating the vents openings of the housing in a covered state.

Referring now to FIGS. 13-15 a rear view of the airbag module is illustrated. As shown housing 316 has a vent opening or vent openings 342, which in accordance with an exemplary embodiment are positioned to align with a plurality of vent openings 344 of inflator 318. As shown in FIGS. 11-14 some of vent openings 344 are positioned to directly align with opening 342 as well as indirectly align with opening 342. Conversely some vent openings 344 are positioned to expel inflation gas into the opening of inflatable cushion 320.

Figure 16:
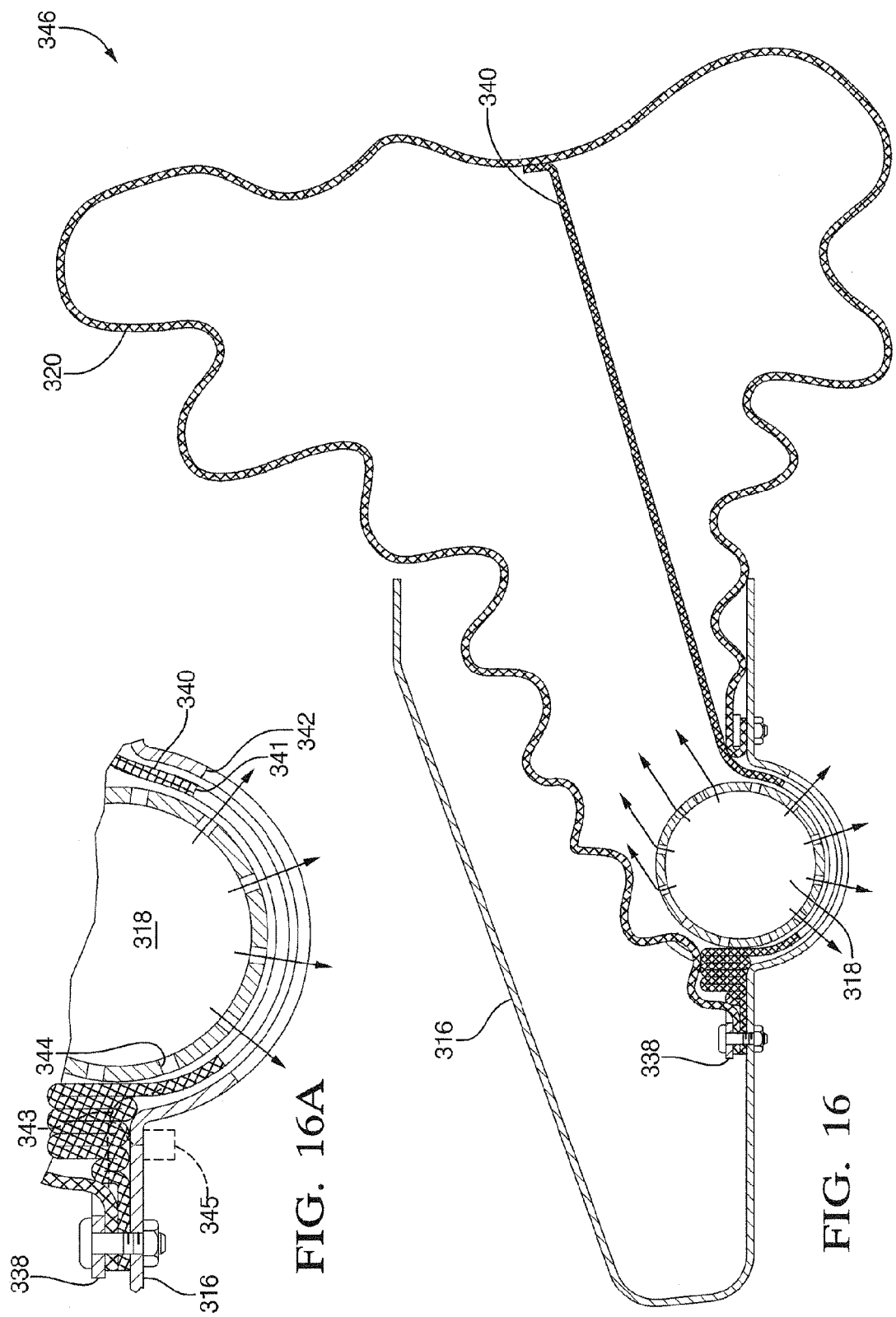
FIG. 16 is a cross sectional view of an airbag module in a first deployed state.
Figure 17:
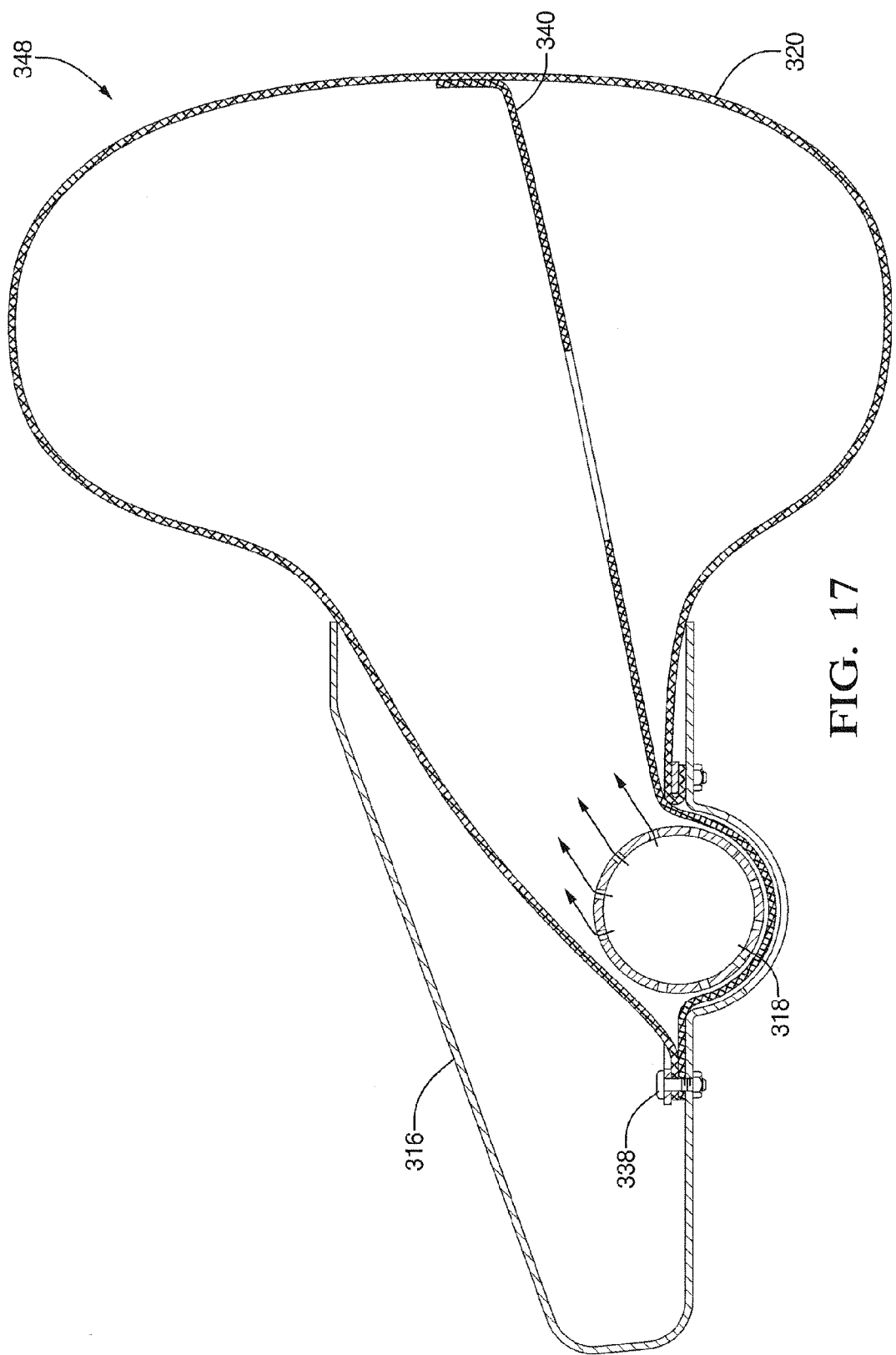
FIG. 17 is a cross sectional view of an airbag module in a second deployed state.

In order to provide two different levels of venting through openings 342, tether 340 adjusts the venting through the back side of the airbag module housing in accordance with a first expanded state/profile 346 (FIG. 16) or second expanded state/profile 348 (FIG. 17). For example, when the inflatable cushion is initially deployed and not yet fully inflated, tether 340 is secured to the module such that opening or openings 342 are not blocked by the tether; thus inflation gas may be expelled directly out of the airbag module housing (e.g., FIG. 16). This is facilitated by openings 341 in the tether which are aligned with openings 344 in the inflator and as discussed above are directly aligned with opening 342 in the housing.

In addition, if the tether does not fully extend openings 342 allow inflation gas to be expelled from the housing as opposed to being expelled into the inflatable cushion.

Alternatively, and as illustrated in FIG. 17, when the inflatable cushion reaches its fully expanded state tether 340 is pulled taught and then covers openings 342 thereby directing more inflation gas into the cushion. This is facilitated by, when tether 340 is fully extended and openings 341 are no longer aligned with opening 342 and tether 340 is manufactured out of a material having characteristics for blocking the inflation gas from the openings of the inflator aligned with the opening in the housing. In order to prevent opening 342 from becoming blocked before tether 340 is fully extended, a portion of tether 340 is cinched up and stitched together with releasable threads 343 (e.g., threads that will break free when tether 340 is pulled taught). Alternatively, the tether is folded such that a portion of the tether proximate to the point of securement to the housing will not be unfurled or unfolded until the cushion reaches a full deployment (e.g., no releasable stitching).

Another embodiment of the present invention is the use of the tether with a dual stage inflator having a primary stage and a secondary stage wherein the primary stage provides a larger inflation output through a first plurality of openings in the inflator housing and, the secondary stage provides a smaller inflation output through a second plurality of openings in the inflator housing. In yet another embodiment, the primary stage and the secondary stage may provide equal inflation outputs.

Accordingly, the primary and secondary exit nozzles are separate (to a certain extent) from each other. For example, as illustrated in FIGS. 11-14, 310, 312 and 313, a first row of exit nozzles are disposed left of the center of the inflator and a second row of exit nozzles are disposed right of the center of the inflator. Accordingly, the first row of exit nozzles may comprise the primary exit nozzles and the second row of exit nozzles may comprise the secondary exit nozzles or vice versa. In yet another embodiment, the primary nozzles may be disposed proximate to the inflation opening of the inflatable cushion and the secondary nozzles may be disposed proximate to the back side of the inflator (e.g., facing away from the inflation opening of the inflatable cushion) or vice versa.

In any of the aforementioned embodiments, either the inflator's primary or secondary exit nozzles can be aligned with the vents on the back of the housing changing the cushion kinematics as well as the pressure. The features of this embodiment are achieved by directly aligning the housing vent opening, the tether opening for facilitating venting and the primary or secondary or both nozzles of the inflator. Alternatively, all of the nozzles may be used for both the primary and secondary nozzles.

The possibility of firing the primary or the secondary stage first also can be decided by the sensing and diagnostic module (SDM) based on the severity of the activation event and the multiple inputs of the multiple sensors as discussed above.

In accordance with one exemplary embodiment, and in order to provide the use of the tether as a sensor, the cushion is folded in the housing such that a portion of it extends out of the instrument panel first and after that portion reaches its rearward most extent, the remainder of the cushion feeds out radially or in other directions as opposed to those in the "x" direction. A non-limiting example of the "x" direction is illustrated in FIG. 25C. An example of such a cushion fold is illustrated in FIGS. 24A-24G and an example of deployment sequences of various embodiments are illustrated in FIGS. 25A-25F.

Figure 17A:
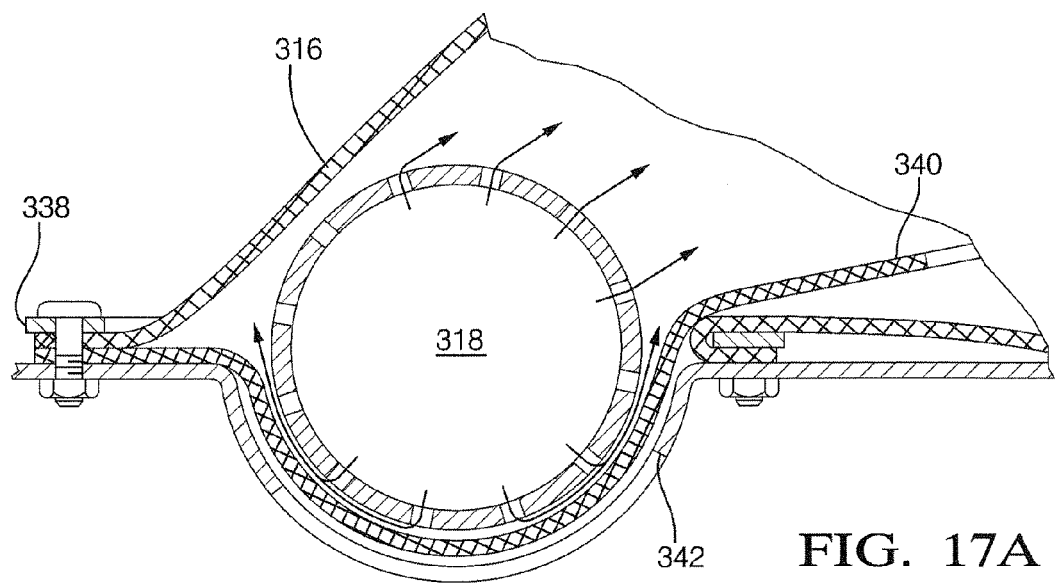
FIG. 17A is an enlarged view of a portion of FIG. 17.
Figure 18:
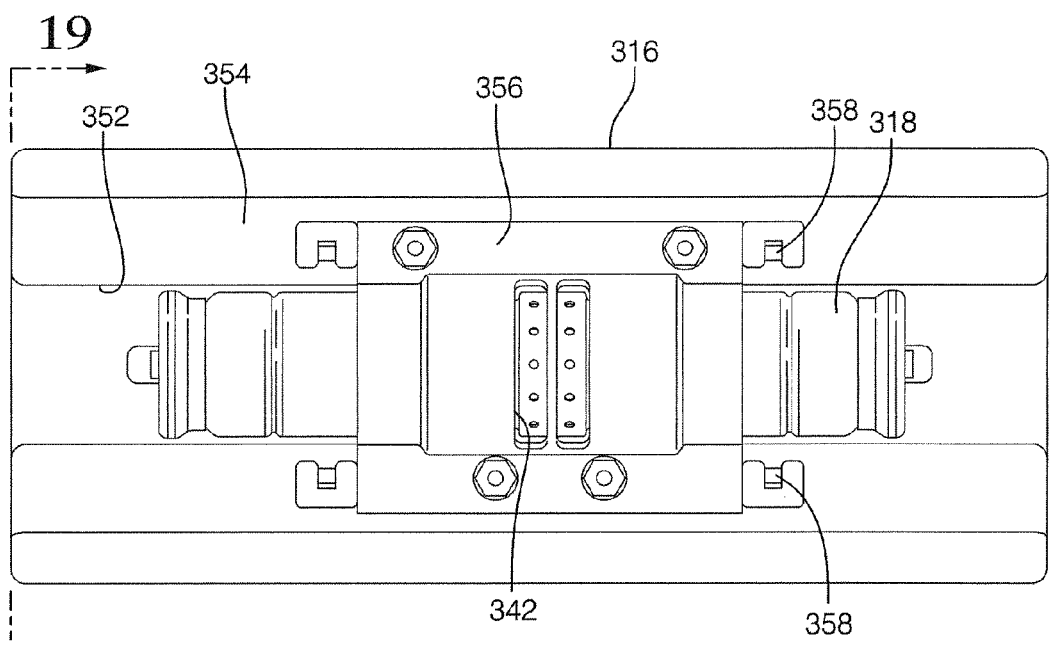
FIG. 18 is a rear view of an airbag module constructed in accordance with an alternative exemplary embodiment of the present invention illustrating the vents openings of the housing in an uncovered state.
Figure 19:
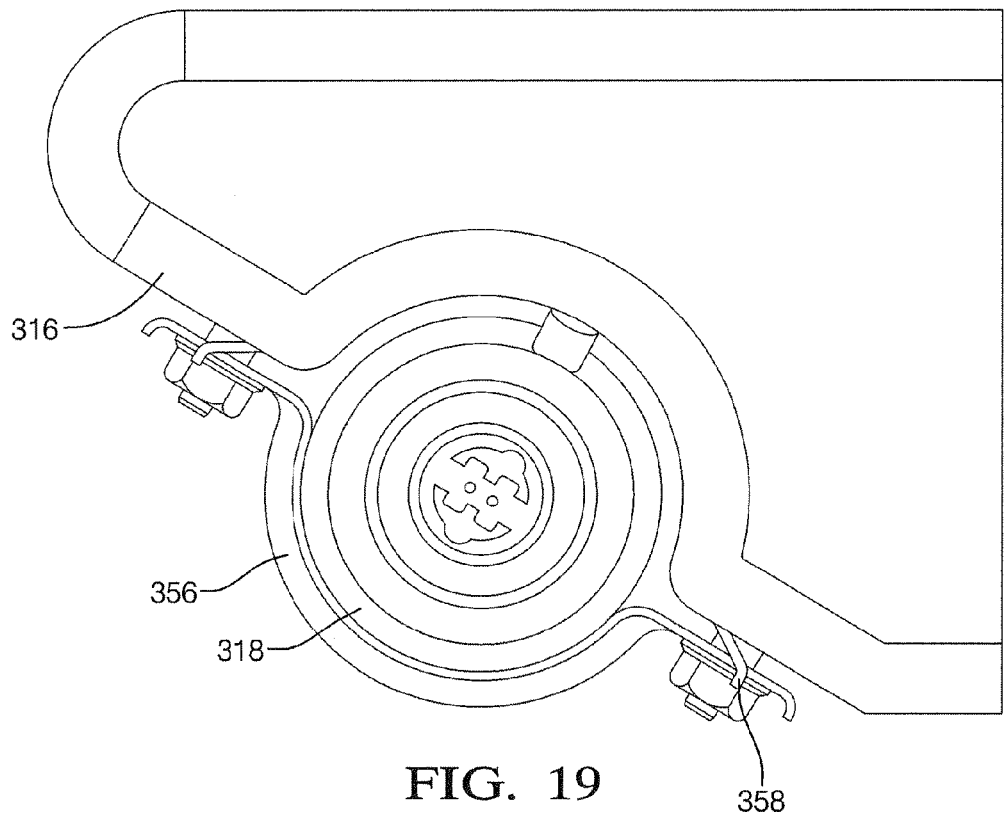
FIG. 19 is a view along lines 19-19 of FIG. 18.
Figure 20:
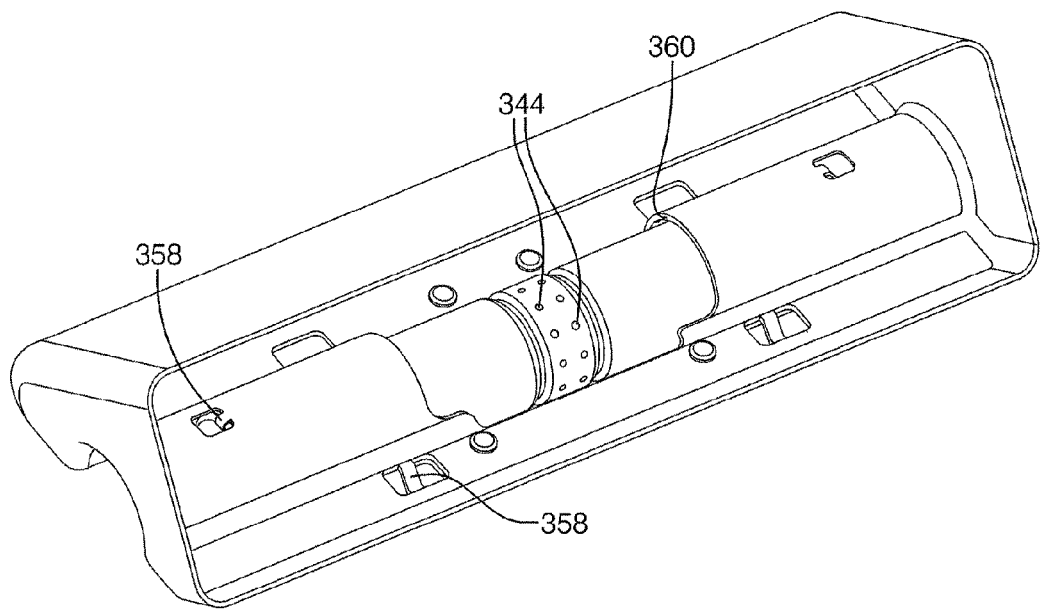
FIG. 20 is a front perspective view of the airbag module illustrated in FIGS. 18 and 19.
Figure 21:
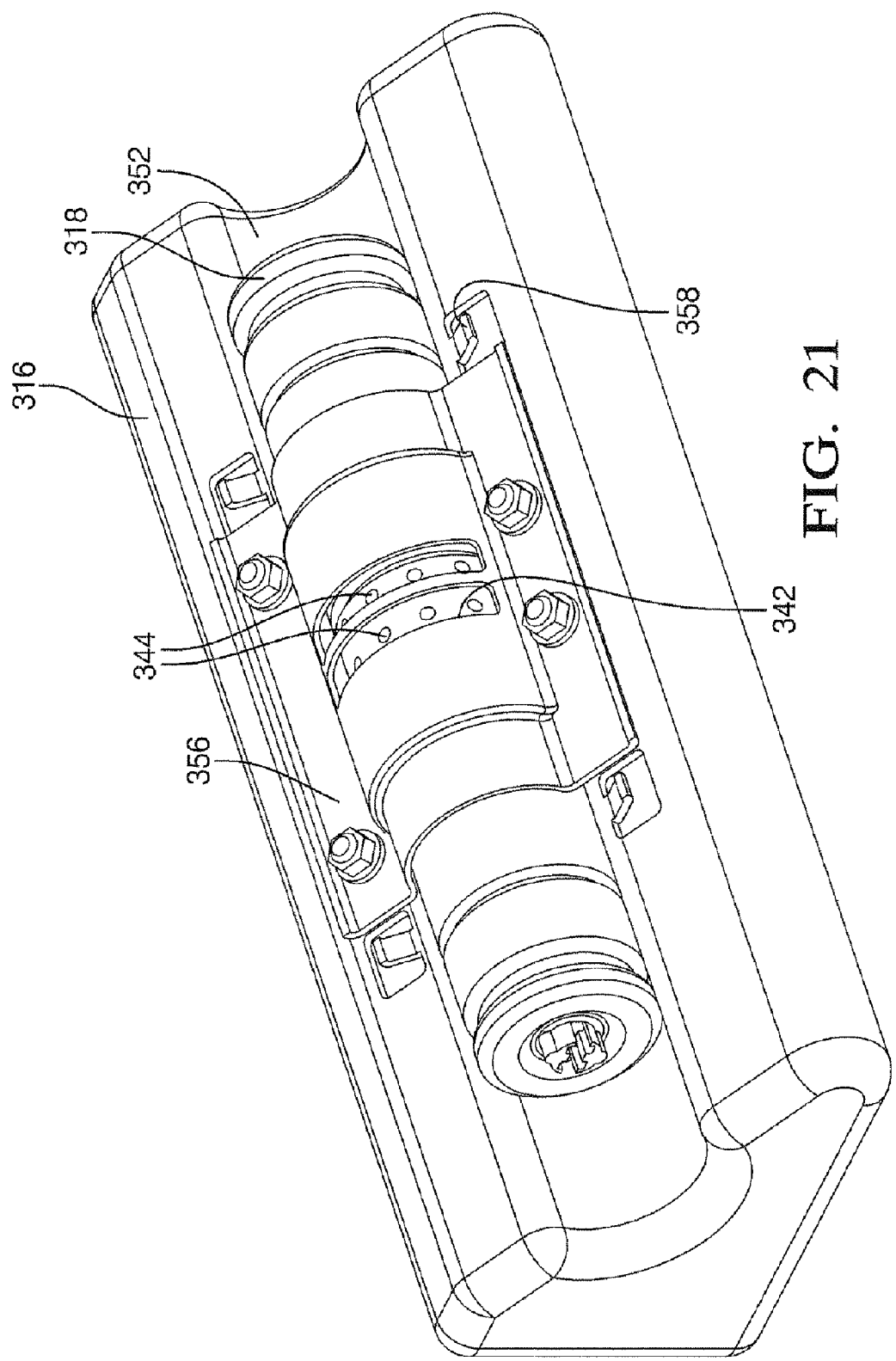
FIG. 21 is a rear perspective view of the airbag module illustrated in FIG. 20.

In accordance with another alternative embodiment, the tether is arranged to have a first non-venting configuration, then a venting configuration and then a non-venting configuration upon full deployment of the tether. In other words the opening in the tether is moved to provide this feature. This is facilitated by folding and installing the tether such that the tether openings are not initially aligned with the inflator vents and the housing opening and as the cushion starts to deploy the tether is pulled into the configuration illustrated in FIG. 16A and if the cushion fully deploys the tether ultimately moves towards the configuration of FIG. 17A. This would allow extra inflation gas or pressure to build up in the housing during the initial break out phase of deployment (e.g., tearing of the door opening in the instrument panel. Moreover, one contemplated embodiment would be to prevent the tether from reaching the configuration of FIG. 16A until a portion of the cushion has passed through an opening in the instrument panel, this is facilitated by manipulating the length and folds of the tether.

Accordingly, and in any of the aforementioned embodiments tether 340 is indicative of the progress of the inflatable cushion into the vehicle and the tether provides a means for facilitating venting through the back side housing.

An assembly sequence of the embodiment of FIGS. 10-15 is as follows: placing the retainer inside the inflation opening of the inflatable cushion; pulling an attachment end of the tether out of the inflatable cushion, the other end of the tether being secured to the inside of the inflatable cushion by for example stitching; placing the inflator onto the cushion retainer and wrapping the tether around the inflator and attaching the tether to the securement studs of the cushion retainer; and then placing the cushion retainer, cushion and inflator assembly into the airbag module housing and fastening the same to the housing with a plurality of securement members such as nuts.

Thus, the tether is configured to adjust the venting based upon rearward excursion (e.g., movement towards the seating structure 312) of the cushion. As an alternative embodiment, tether 340 may comprise a semi-permeable material, which acts like a filter for filtering combustion by-products of inflator 318 which may be exhausted out of openings 344 during the position of FIG. 16A or even FIG. 17A. In this embodiment the semi-permeable material would be disposed over opening 341.

In yet another alternative embodiment, tether 340 is configured and positioned to interact with an actuator or sensor or sensing device 345 wherein movement of the tether away from a pre-deployment position to a fully deployed cushion (FIG. 16A-FIG. 17A) causes the tether to be moved away from a sensing device. The sensing device would then provide a signal indicative of this movement to a micro-controller or other equivalent device in order to provide a signal to another device such as a second stage inflator or initiator to provide additional inflation gases or another device for actuating a device for closing the vent openings in the housing.

One non-limiting example of such a configuration would be a magnetic member (347) disposed in the tether and a Hall effect sensor (illustrated schematically as item 345 in FIG. 16A) positioned to sense the magnetic field of the magnet. Thus, when the magnet moves away the field changes and this is sensed by the sensor that provides an output signal. Another sensing device could be an actuator manipulated by the tether or a sensor disposed directly on the tether. Such a sensor could be disposed in the location illustrated schematically as item 347 in FIGS. 22 and 23. In yet another alternative the sensor could comprise the stitching or an electrical lead 343 that is secured to the tether at one end and the sensor at the other wherein the tether would pull on the lead as it deploys and the sensor would provide a signal when it is torn or alternatively the movement of the tether would be detected by the sensor. Such a signal is then sent to a sensing and diagnostic module or other microcontroller for use in a control algorithm which may instruct another device to be activated (e.g., firing of a second initiated in a two-stage inflator).

One example of such a sensor is that, electrical lead 343 would comprise part of an electrical circuit in sensor 345 configured to provide a signal or lack of detectable current when lead 343 is torn. Alternatively, item 343 is a wire or length of material that pulls upon a detection circuit when tether 340 is unfurled for example wire 343 would pull or break a conductive item of a detection circuit thus providing a means of providing a signal to a controller or sensing and diagnostic module.

Figure 26:
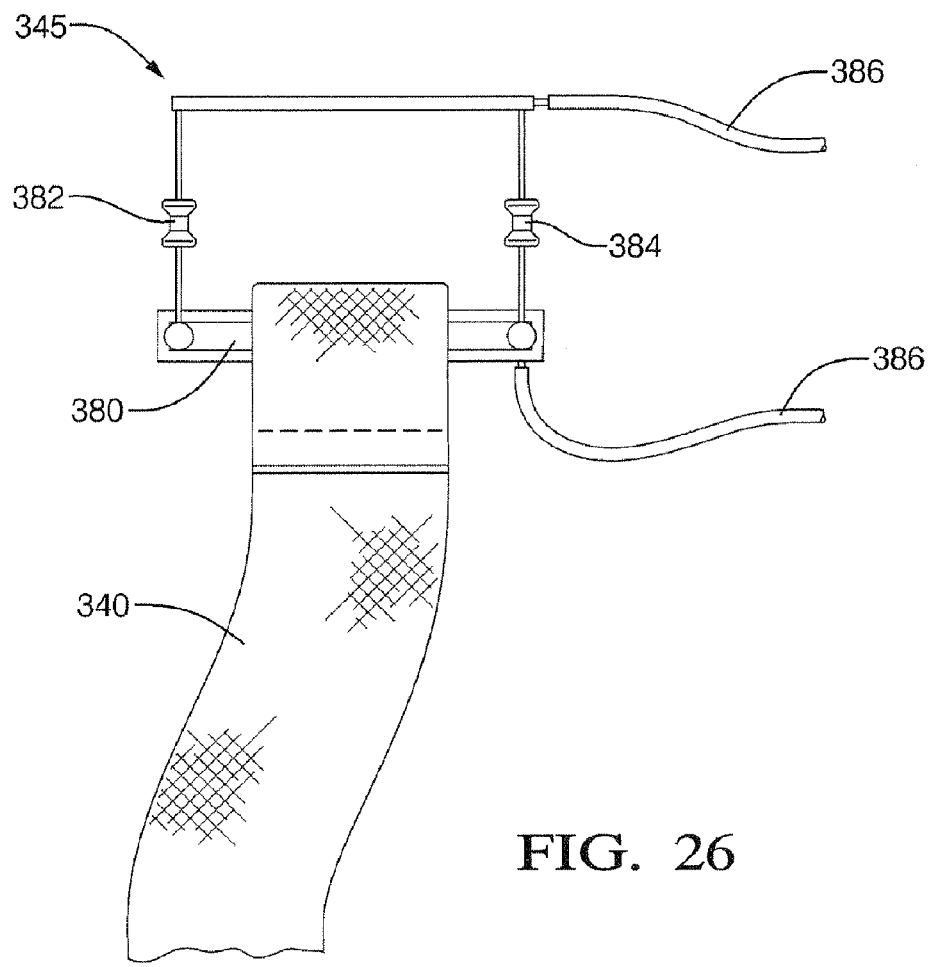
FIG. 26 is a schematic illustration of a sensor device or element contemplated for use in exemplary embodiments of the present invention.

Referring to FIG. 26, an example of sensing device or element 345 is illustrated; here tether 340 is secured to a conductive member 380 that is broken when the tether is pulled to its full deployment length. In this embodiment conductive member 380 is configured to break or tear such that it no longer provides an electrical path between a first resistor 382 and a second resistor 384, which are connected in parallel by electrical connectors 386. Accordingly, when conductive member 380 provides an electrical path between first resistor 382 and second resistor 384 a known resistance is provided. However, when the inflatable cushion reaches an unobstructed deployment configuration, a force is applied to the conductive member such that the conductive path between the first resistor and the second resistor is no longer available. Accordingly, the resistance encountered by the electrical connectors will be equal to that of the second resistor. Therefore, control logic of the sensing and diagnostic module can be easily configured to determine whether the conductive member has been severed. For example, if each of the resistors has the same resistance, severing of the conductive member will cause the resistance to double. In addition, a sensing and diagnostic module connected to sensing device or element 345 for receiving signals of the same can easily determine whether the power has been cut or there is a short-circuit in the system. In each of these cases the control logic of the sensing and diagnostic module will be configured to provide an appropriate output signal. It is, of course, understood that the aforementioned illustration of the sensing element 345 is provided as a non-limiting example and any other means for providing an output signal in response to a force received by the tether is contemplated to be within the scope of the present invention. Moreover, the location of the sensing element 345 may be in other locations than those illustrated in the attached Figures for example and depending on the embodiment, the sensing element may be in other locations including but not limited to; within the housing, within the cushion, outside the housing, etc. In addition, and again depending on the embodiment an electrical lead attached to the deploying slack of the tether may pass through an opening in the housing depending on the location of the sensing element, alternatively the tether itself may be attached to the sensing element (FIG. 26) wherein that portion of tether passes through an opening in the housing or not depending on the configuration used and sensor location and in yet another alternative the end of the tether secured to the sensor may be allowed to break free after extending a predetermined length and providing the signal to the sensing device.

Alternatively, and in accordance with an exemplary embodiment wherein the tether is used with or without a sensor device 345 the end of the tether opposite to its point of securement to the inflatable cushion may be unsecured within the airbag module. Thus, and as the inflatable cushion deploys the tether is configured to allow venting or not depending on the amount of egress of the inflatable cushion into the passenger compartment.

Alternatively, and where magnets and Hall effect devices are used the location of the magnets secured to the tether must be in close proximity to the Hall effect device so that movement can be detected. In any of the aforementioned embodiments the sensor is configured to provide a signal to a sensing and diagnostic module, which comprises logic or is adapted to provide additional signals upon receipt of a signal indicating the full length of the tether has been deployed.

Referring now to FIGS. 18-22 an alternative exemplary embodiment is illustrated. Here a cylindrically shaped inflator similar to that of the embodiment of FIGS. 10-15 is mounted into an elongated channel 352 disposed on a back side 354 of an airbag module housing 316. Here inflator 318 is secured to the housing 316 by a mounting plate 356. Mounting plate 356 is configured to wrap around a portion of inflator 318 by having a curved receiving area for mating with a curved portion of the inflator. Mounting plate 356 is configured to have at least one opening 342 for aligning with vent openings 344 of inflator 318. As illustrated inflator 318 has two rows of vent openings disposed about the periphery of a central portion of the inflator and the two rows of vent openings are aligned with two elongated openings in mounting plate 356. Of course, this is but one configuration of the venting scheme of the inflator through the backing plate.

Housing 316 is also configured to have a plurality of integral mounting hooks 358 for airbag securement. In addition, and referring now to FIG. 21 a top view of housing 316 is illustrated. Here housing 316 is configured to have a central opening 360 for allowing the inflation gas of the inflator to enter into the inflatable cushion. Similar to the embodiment of FIGS. 10-17, at least one tether is secured to an inner surface of the inflatable cushion and as it is pulled taught the openings 342 of backing plate 356 will be sealed off from the exterior of the housing by a portion of the tether.

Figure 22:
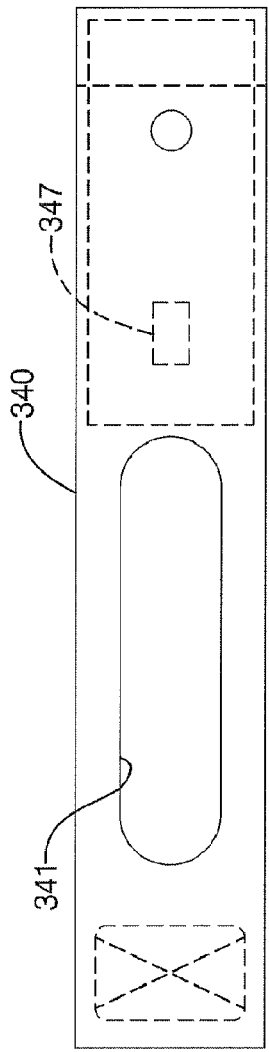
FIG. 22 is a top plan view of a sensor tether of one exemplary embodiment of the present invention.
Figure 23:
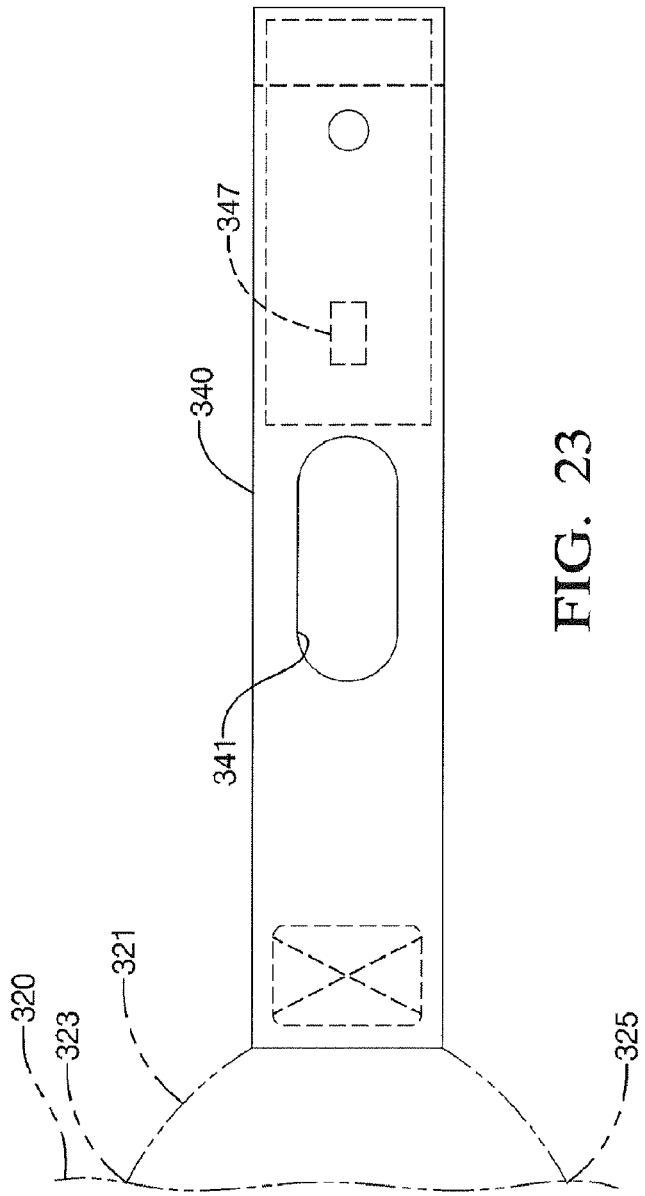
FIG. 23 is a top plan view of a sensor tether of another exemplary embodiment of the present invention.
Figure 24B:
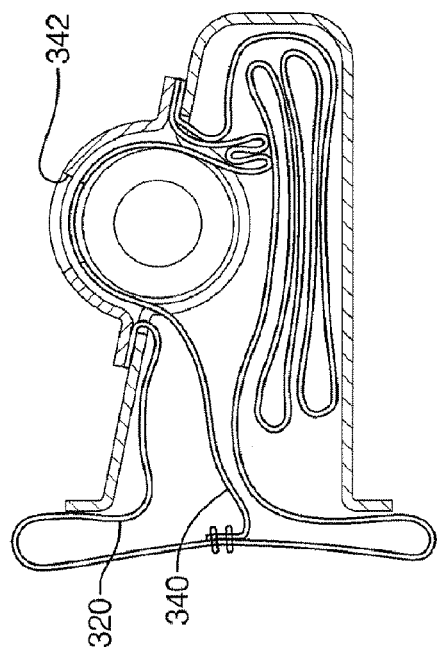
FIGS. 24A-24G illustrate the folding of the inflatable cushion and the tether of an exemplary embodiment of the present invention.
Figure 24C:
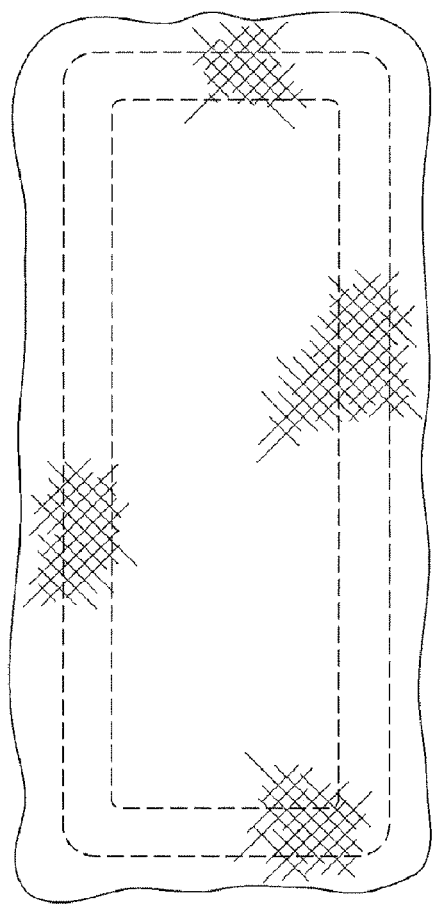
Figure 24A:
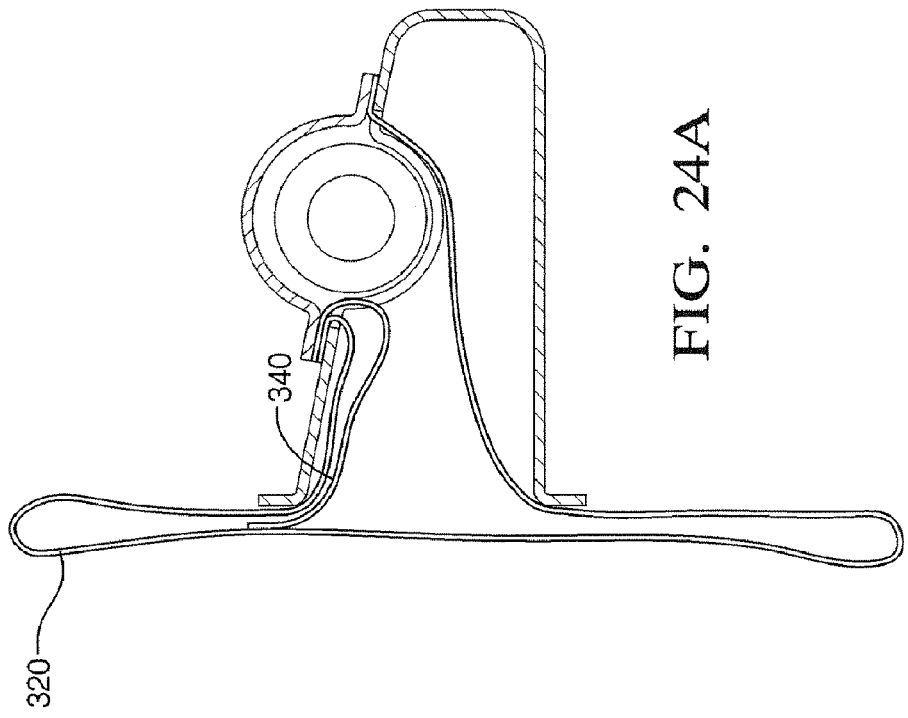
Figure 24F:
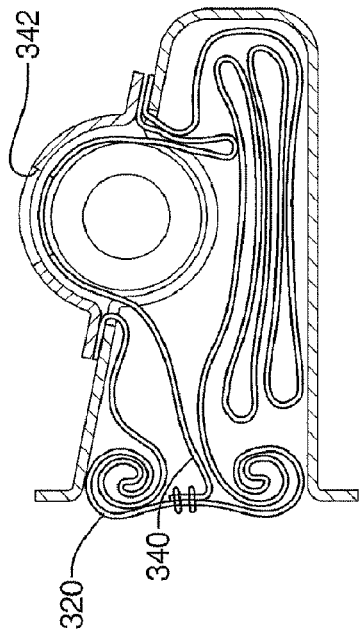
Figure 24G:
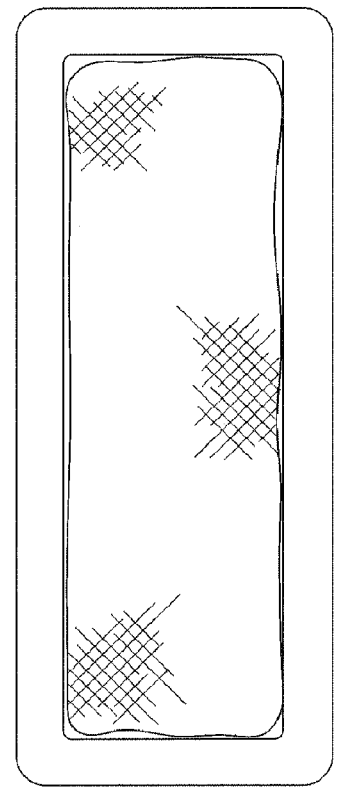
Figure 24D:
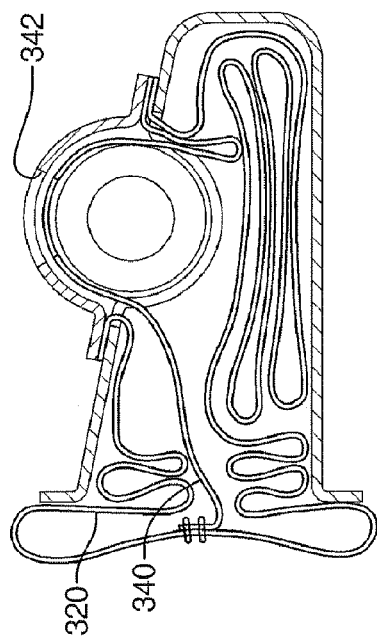
Figure 24E:
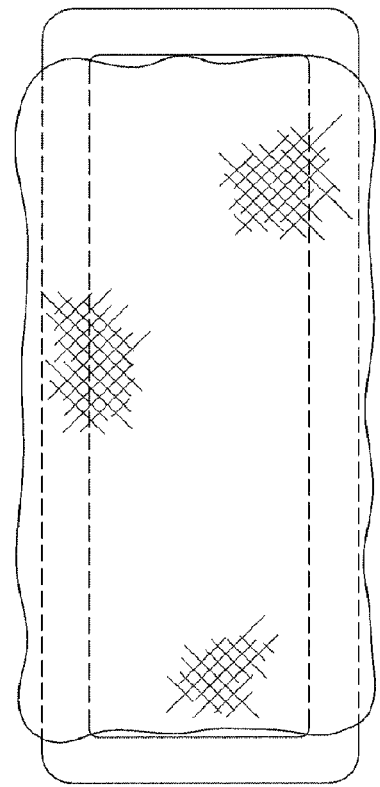

Referring now to FIGS. 22 and 23, possible configurations for tether 340 are illustrated. It is, of course, understood that other configurations for tether 340 are contemplated to be within the scope of the present invention. Moreover, the specific dimensions illustrated in the attached Figures as well as the amount of folded tether its location and length are intended to provide examples of exemplary embodiments however, other configurations and dimensions are considered to be within the scope of the present invention. One exemplary length of the tether comprises an overall length of 14-22 inches with an opening of 4-6 inches in length wherein 2-8 inches of the tether is folded up behind the opening. Of course, it is understood that exemplary embodiments of the present invention can encompass lengths greater or less than the aforementioned values.

FIGS. 22 and 23 illustrate a point of securement of the tether to the interior surface of the inflatable cushion, and opening 341 in the tether is configured to provide venting when the tether or the opening is positioned between discharge vents of the inflator and the vent opening of the housing. Furthermore, the Figures also illustrate the securement point of the tether to the module, and opening for a stud of the retainer and a portion of the tether or which acts as the sealing member for blocking off the vent aperture of the housing.

It is understood that many variations or alternative exemplary embodiments are considered to be within the scope of the present invention, for example a single tether 340 may be used or alternatively additional tethers may be used within the inflatable cushion, the vent aperture of the tether may comprise a single elongated opening or a plurality of openings. For example, a plurality of openings may be used for venting or a plurality of openings may be used for venting and different employment stages of the tether. In addition, the tether may comprise multiple securement openings for engagement by multiple securement studs of the retainer or other securement means.

In addition, and in an alternative embodiment, the portion of the tether blocking the opening may be manufactured out of a material which provides a heat shield between the diffuser openings of the inflator and the vent opening of the housing.

As illustrated in FIGS. 24A-25F, the tether and the inflatable cushion are folded in such a manner that the tether and the cushion are allowed to deploy partially through the airbag module and its deployable door (e.g., instrument panel, etc.) wherein venting is allowed to occur through the vent opening of the housing as the cushion deploys to the configuration illustrated in FIG. 25C, a limit of travel in the "x" direction is met and the vent is closed by pulling the tether to its fully extended positioned such that the vent opening of the tether is no longer aligned with the vent opening of the housing and the inflator. At this point there is very little additional rearward excursion of the cushion and the cushion deploys radially outward or in other directions as opposed to the "x" direction wherein all of the, or substantially all of the inflation gases are now directed into the inflatable cushion (e.g., the transition from FIG. 25C to FIG. 25D).

Figure 25A:
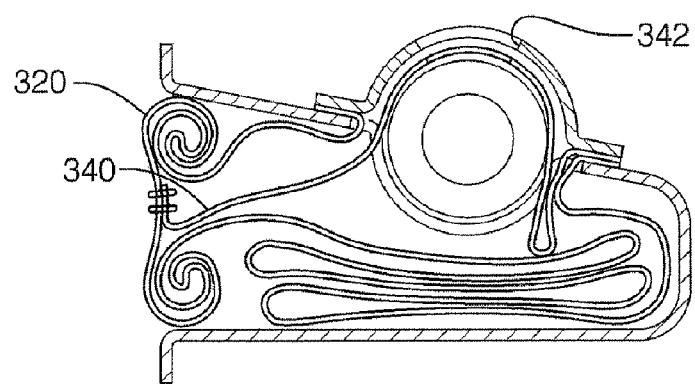
FIGS. 25A-25F illustrate deployment sequences of the tether and inflatable cushion of various exemplary embodiments of the present invention.
Figure 25B:
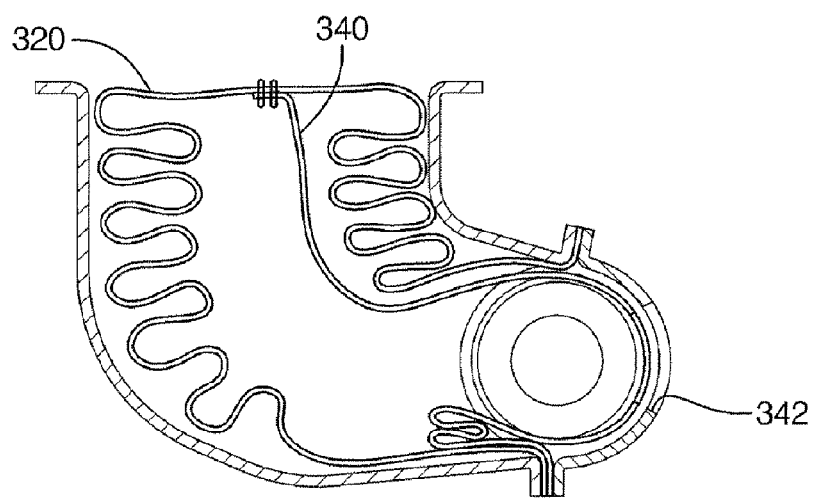
Figure 25C:
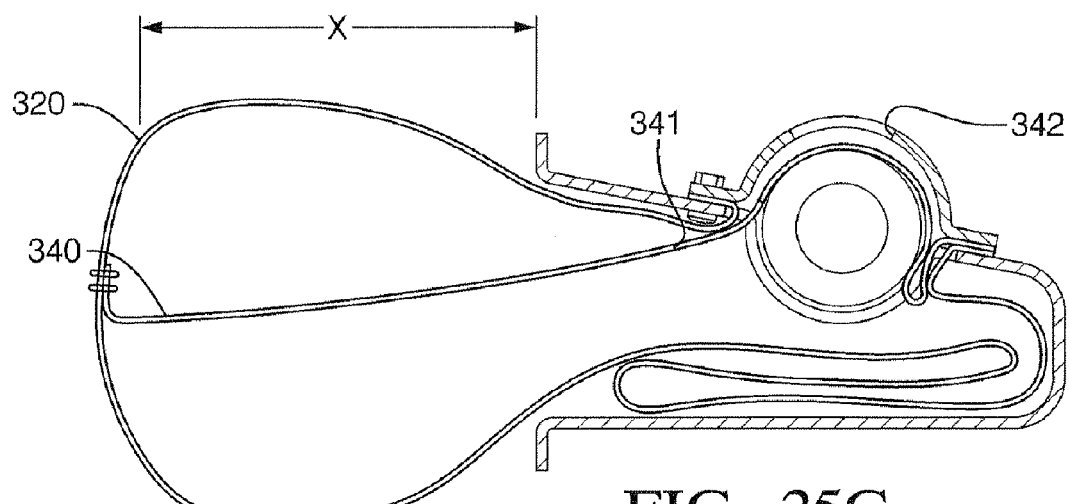
Figure 25D:
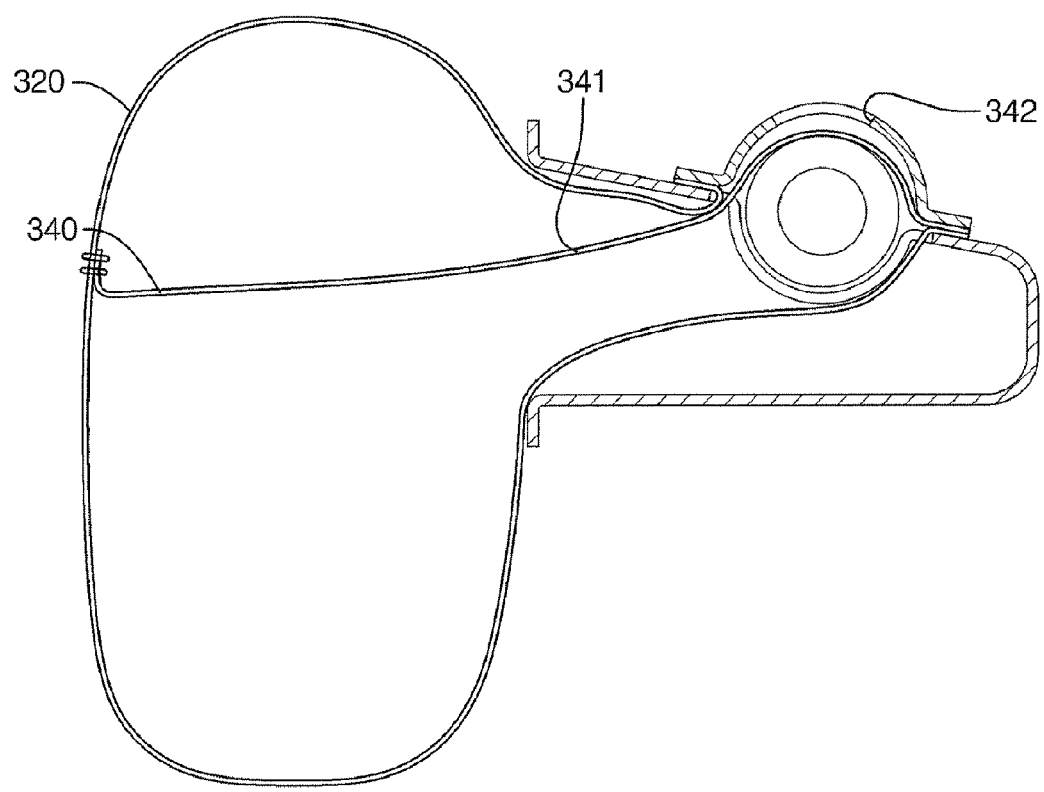

Referring now to FIGS. 25A-25D deployment of a "forward pull" tether is illustrated. In this embodiment, the inflator is mounted on the top portion of the housing and the tether is positioned to allow venting through the housing when the cushion is not deployed and the portion of the tether that is deployed is furled up at the rear portion of the inflator so that as the tether unfurls a distance equal to a predetermined amount of egress rearward into the passenger compartment of the vehicle the opening of the tether is no longer aligned with the vent opening. This position is illustrated in FIG. 25C, at this point the vent opening is blocked and the cushion continues to deploy in a radial manner (FIG. 25D). FIG. 25B illustrates an alternative housing design wherein the housing is configured for use with a "forward pull" tether.

Figure 25E:
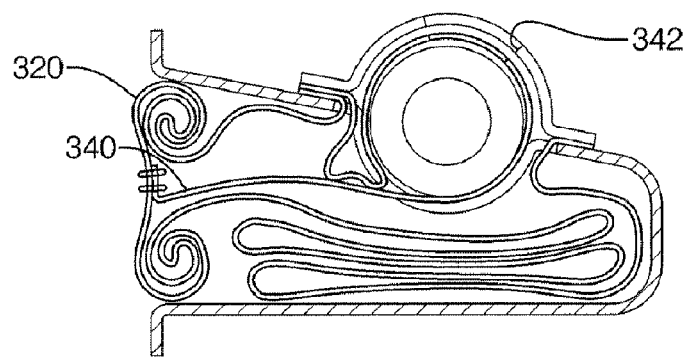
Figure 25F:
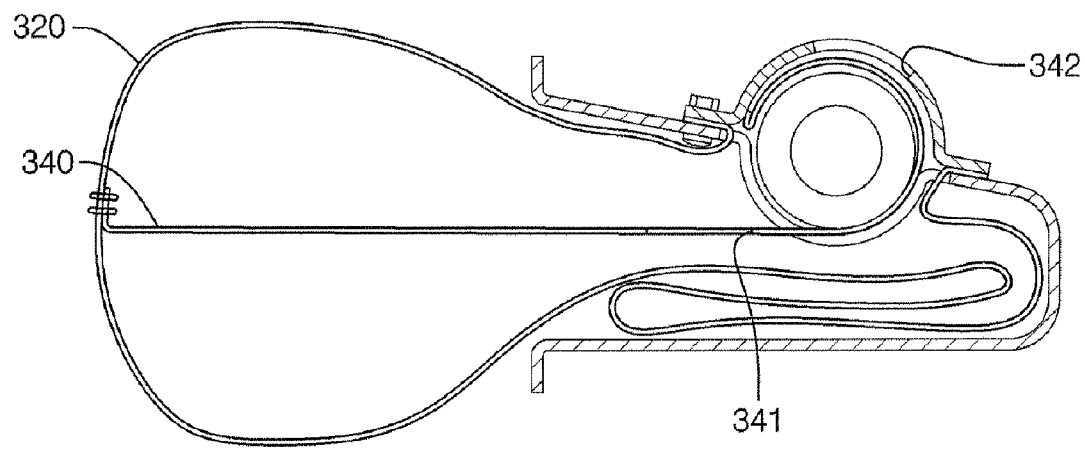

FIGS. 25E-25F illustrate a "rearward pull" tether wherein the tether is positioned to allow venting through the housing when the cushion is not deployed and the portion of the tether that is deployed is furled or folded up at the forward portion of the inflator so that as the tether unfurls a distance equal to a predetermined amount of egress into the passenger compartment the tether blocks the vent opening. In either embodiment of the "forward pull" or the "rearward pull" the inflator gases of the inflator cause the tether to slide over the inflator housing on a cushion of air as the tether unfurls. In other words a cushion of air is disposed between the tether and the inflator housing and inflator openings as the tether slides over the inflator.

In addition, the tether of the airbag module embodiments of FIGS. 25A-25F may also be secured to an actuating device or sensor (FIGS. 16A and 26) in order to provide a signal to a control module or sensing and diagnostic module in order to provide an activation signal to a second stage of a dual stage inflator. Alternatively, the tether may comprise a magnet whose movement is detected by a Hall effect device.

It is also noted that the inflator, the venting portion of the tether and the vent opening of the housing are capable of being disposed in any of the walls of the housing of the airbag module. For example, FIG. 16 shows the inflator secured to a lower surface of the housing while FIGS. 25A-25F show the inflator secured to an upper surface of the housing. It is of course understood that the inflator can be also mounted to the portion of the housing between the bottom and top of the housing.

Accordingly, one exemplary embodiment of the present invention is directed to an assembly wherein the inflatable cushion deploys through a deployable door with a first inflation pressure and venting scheme and thereafter the cushion deploys in other non rearward directions with an inflation pressure and venting scheme that is determined by all or any one of the following items, sensor input, staged inflation and the position of the tether or tether sensor. Of course, other items may be included in accordance with the exemplary embodiments of the present invention to determine and provide the desired venting scheme.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag module, comprising:
a housing having at least one vent opening;
an inflatable cushion being stored in an un-deployed position in the housing, the inflatable cushion being configured to be deployed out of the housing;
an inflator for inflating the inflatable cushion, the inflator being in fluid communication with the inflatable cushion and having a plurality of inflation openings for allowing an inflation gas to pass therethrough;
a deployable member having a first end secured to the housing, a second end secured to an interior surface of the inflatable cushion, and a portion between the first end and the second end overlaying the vent opening; and
wherein the deployable member is configured to allow venting through the at least one vent opening when the inflatable cushion is in the un-deployed position and the at least one vent opening is covered by the deployable member when the inflatable cushion inflates towards a fully deployed position and wherein the deployable member comprises an elongated opening for alignment with at least some of the plurality of inflation openings of the inflator and the at least one vent opening.

2. The airbag module as in claim 1, wherein the inflator is cylindrically shaped and the plurality of inflation openings are disposed about a periphery of the inflator, and the portion deploys around the periphery of the inflator.

3. The airbag module as in claim 1, wherein the inflator provides a first inflation output to the inflatable cushion when the deployable member is not fully extended and a second inflation output to the inflatable cushion when the deployable member is fully extended and wherein the deployable member is folded within the housing.

4. The airbag module as in claim 3, wherein the first inflation output is provided when the inflatable cushion is not fully deployed.

5. The airbag module as in claim 1, wherein the airbag module is either a driver side or passenger side airbag module.

6. The airbag module as in claim 1, wherein the deployable member comprises a pair of deployable members covering a plurality of venting apertures.

7. The airbag module as in claim 1, wherein the deployable member comprises break away stitching that must be torn prior to the inflatable cushion reaching its fully deployed position.

8. The airbag module as in claim 1, wherein movement of the deployable member to a fully extended length causes a sensor to provide a signal when the deployable member is pulled to its fully extended length.

9. The airbag module as in claim 2, wherein the portion of the deployable member which deploys around the periphery of the inflator is folded within the housing and the at least one vent opening is disposed between the portion of the deployable member and the one end of the deployable member secured to the inflatable cushion.

10. The airbag module as in claim 1, wherein the at least one vent is covered by a filter material disposed on the opening of the deployable member.

11. The airbag module as in claim 1, wherein the length of the deployable member is a predetermined distance the inflatable cushion inflates in a first direction away from the housing.

12. The airbag module as in claim 1, wherein at least one of the plurality of inflation openings is directly aligned with the at least one vent opening.

13. The airbag module as in claim 12, wherein the inflator is cylindrically shaped and the plurality of inflation openings are disposed about a periphery of the inflator, and the portion deploys around the periphery of the inflator.

14. The airbag module as in claim 12, wherein the inflator provides a first inflation output to the inflatable cushion when the deployable member is not fully extended and a second inflation output to the inflatable cushion when the deployable member is fully extended and wherein the first inflation output is provided when the inflatable cushion is not fully deployed.

15. The airbag module as in claim 14, wherein the portion of the deployable member which deploys around the periphery of the inflator is folded within the housing and the at least one vent opening is disposed between the portion of the deployable member and the one end of the deployable member secured to the inflatable cushion.

16. The airbag module as in claim 12, wherein the deployable member comprises an elongated opening for alignment with at least some of the plurality of inflation openings of the inflator and the at least one vent opening.

17. The airbag module as in claim 13, wherein the portion of the deployable member which deploys around the periphery of the inflator is folded within the housing and the deployable member travels around more than ½ of the periphery of the inflator.

18. The airbag module as in claim 12, wherein movement of the deployable member to a fully extended length causes a sensor to provide a signal when the deployable member is pulled to its fully extended length and the fully extended length is a predetermined distance the inflatable cushion inflates in a first direction away from the housing.

19. The airbag module as in claim 18, wherein the sensor is coupled to the deployable member and the signal is provided to a controller, which causes a second stage of the inflator to be fired.

20. An air bag module, comprising:
a housing having at least one vent opening;
an inflatable cushion being stored in an un-deployed position in the housing, the inflatable cushion being configured to be deployed out of the housing;
an inflator for inflating the inflatable cushion, the inflator being in fluid communication with the inflatable cushion and having at least one inflation opening in direct alignment with the at least one vent opening;
a deployable member secured to the inflatable cushion and configured to cover the at least one vent opening; and
wherein the deployable member blocks the at least one vent opening when the inflatable cushion is not restrained and the at least one inflation opening is in fluid communication with the interior of the inflatable cushion.

21. The airbag module as in claim 20, wherein the deployable member is a tether and the tether blocks the at least one vent opening during an initial phase of deployment of the inflatable cushion and thereafter the at least one vent opening is unblocked by the tether until the inflatable cushion reaches a full deployment configuration.

22. The airbag module as in claim 21, wherein the tether comprises an elongated opening for aligning with the at least one vent opening and the at least one inflation opening of the inflator, wherein the length of the tether is a predetermined distance the inflatable cushion inflates in a first direction away from the housing.

23. The airbag module as in claim 20, wherein the deployable member is a tether and the tether blocks the at least one vent after a portion of an un-deployed length of the tether is extended during an initial phase of deployment of the inflatable cushion and thereafter the at least one vent opening is blocked by the tether wherein the un-deployed length of the tether is a predetermined distance a portion of the inflatable cushion inflates in a first direction away from the housing.

24. The airbag module as in claim 20, wherein the inflator is cylindrically shaped and the inflator comprises a plurality of inflation openings disposed about a periphery of the inflator and the deployable member is configured to have a portion which deploys around the periphery of the inflator, wherein the portion of the deployable member which deploys around the periphery of the inflator is folded within the housing and the at least one vent opening is disposed between the portion of the deployable member and an end of the deployable member secured to the inflatable cushion.

25. A venting assembly for an air bag module having an inflator, an inflatable cushion and a housing, the venting assembly comprising:
a tether being secured to an inner surface of the inflatable cushion at one end and the housing at the other;
wherein the tether allows fluid communication between at least one inflation opening of the inflator and at least one vent opening of the housing prior to deployment of a portion of the inflatable cushion a predetermined distance in a first direction and upon the portion of the inflatable cushion reaching the predetermined distance, the tether prevents fluid communication with the at least one inflation opening of the inflator and the at least one vent opening of the housing.

26. The venting assembly as in claim 25, wherein the tether positions a filter material over the at least one vent opening when the tether is not blocking the at least one vent opening.

27. The venting assembly as in claim 25, wherein the tether comprises an elongated opening for alignment with the at least one inflation opening of the inflator with the at least one vent opening of the housing.

28. The venting assembly as in claim 25, wherein movement of the tether to a fully extended length causes a sensor to provide a signal when the tether reaches its fully extended length, wherein the fully extended length of the tether is a predetermined distance the inflatable cushion inflates in a first direction away from the housing.

29. The venting assembly as in claim 25, wherein the inflator is cylindrically shaped and the inflator comprises a plurality of inflation openings disposed about a periphery of the inflator and the tether is configured to have a portion which deploys around the periphery of the inflator, wherein the portion of the tether which deploys around the periphery of the inflator is folded within the housing and the at least one vent opening is disposed between the portion of the tether and a first end of the tether secured to the inflatable cushion, wherein movement of the tether to a fully extended length causes a sensor to provide a signal when the tether is pulled to its fully extended length and the fully extended length is a predetermined distance the inflatable cushion inflates in a first direction away from the housing, wherein the sensor is coupled to the tether and the signal is provided to a controller, which causes a second stage of the inflator to be fired.

30. The venting assembly as in claim 25, wherein the tether allows direct alignment of the at least one inflation opening of the inflator with the at least one vent opening of the housing prior to full deployment of the inflatable cushion and upon full deployment of the inflatable cushion, the tether blocks direct alignment of the at least one inflation opening of the inflator with the at least one vent opening of the housing.

31. A method for providing venting of an inflation output of an inflator in an airbag module, comprising:

securing a first end of a deployable member to a housing, the housing having at least one vent opening;

securing a second end of the deployable member to an interior surface of an inflatable cushion being stored in an un-deployed position in the housing, the deployable member being configured, dimensioned and positioned to have a deployable length for deployment within the inflatable cushion in a first direction, and the deployable member having a portion between the first end and the second end overlaying the at least one vent opening; and wherein venting of a portion of the inflation output occurs through the at least one vent opening until a portion of the deployable length of the deployable member is moved as the cushion deploys in the first direction and wherein the deployable member further comprises an elongated opening in the portion of the deployable member, the elongated opening being configured for alignment with the at least one vent opening of the housing and at least some of a plurality of inflation openings of the inflator.

* * * * *